(12) United States Patent
Edelstein et al.

(10) Patent No.: US 8,060,531 B2
(45) Date of Patent: Nov. 15, 2011

(54) DATA QUERY AND LOCATION THROUGH A CENTRAL ONTOLOGY MODEL

(75) Inventors: Joseph Edelstein, Jerusalem (IL); Hayden Marchant, Ramat Beit Shemesh (IL); Rannen Meir, Jerusalem (IL); Marcel Zvi Schreiber, Jerusalem (IL)

(73) Assignee: International Business Machines Corporation, Armonk, NY (US)

( * ) Notice: Subject to any disclaimer, the term of this patent is extended or adjusted under 35 U.S.C. 154(b) by 480 days.

(21) Appl. No.: 12/253,798

(22) Filed: Oct. 17, 2008

(65) Prior Publication Data

US 2009/0077051 A1 Mar. 19, 2009

Related U.S. Application Data

(63) Continuation of application No. 11/134,725, filed on May 20, 2005, now Pat. No. 7,475,084.

(51) Int. Cl.
*G06F 17/30* (2006.01)
(52) U.S. Cl. ......... 707/791; 707/802; 707/822; 707/828
(58) Field of Classification Search ........... 707/600–831
See application file for complete search history.

(56) References Cited

U.S. PATENT DOCUMENTS

| | | |
|---|---|---|
| 5,295,242 A | 3/1994 | Mashruwala et al. |
| 5,499,371 A | 3/1996 | Henninger et al. |
| 5,627,979 A | 5/1997 | Chang et al. |
| 5,710,917 A | 1/1998 | Musa et al. |
| 5,734,887 A | 3/1998 | Kingberg et al. |
| 5,768,580 A | 6/1998 | Wical |
| 5,799,309 A | 8/1998 | Srinivasan |
| 5,838,965 A | 11/1998 | Kavanagh et al. |
| 5,857,197 A | 1/1999 | Mullins |
| 5,873,093 A | 2/1999 | Williamson et al. |
| 5,878,434 A | 3/1999 | Draper et al. |
| 5,905,987 A | 5/1999 | Shutt et al. |
| 5,937,409 A | 8/1999 | Wetherbee |
| 5,970,490 A | 10/1999 | Morgenstern |
| 5,995,756 A | 11/1999 | Herrmann |

(Continued)

FOREIGN PATENT DOCUMENTS

GB 2399665 A 9/2004

(Continued)

OTHER PUBLICATIONS

Liu Jin et al, "A Methodology for Acquisition of Software Component Attribute Ontology", The Fourth International Conference on Computer and Information Technology, 2004, p. 1058-1064.

(Continued)

*Primary Examiner* — Isaac M Woo
(74) *Attorney, Agent, or Firm* — Arthur J. Samodovitz; Yee & Associates PC

(57) ABSTRACT

A data query system including a first storage medium including a data schema having a data schema query language associated therewith, a second storage medium including an ontology model including classes and properties, the ontology model having an ontology query language associated therewith, wherein constructs of the database schema are mapped to corresponding classes, properties or compositions of properties of the ontology model, and an ontology query processor generating a query expressed in the data schema query language corresponding to a specified query expressed in the ontology query language. A method is also described and claimed.

12 Claims, 14 Drawing Sheets

U.S. PATENT DOCUMENTS

| | | |
|---|---|---|
| 6,014,666 A | 1/2000 | Helland et al. |
| 6,035,342 A | 3/2000 | Bernstein et al. |
| 6,173,289 B1 | 1/2001 | Sonderegger et al. |
| 6,175,837 B1 | 1/2001 | Sharma et al. |
| 6,192,365 B1 | 2/2001 | Draper et al. |
| 6,199,059 B1 | 3/2001 | Dahan et al. |
| 6,219,654 B1 | 4/2001 | Ruffin |
| 6,233,586 B1 | 5/2001 | Chang et al. |
| 6,289,338 B1 | 9/2001 | Stoffel et al. |
| 6,292,804 B1 | 9/2001 | Ardoin et al. |
| 6,301,584 B1 | 10/2001 | Ranger |
| 6,311,194 B1 | 10/2001 | Sheth et al. |
| 6,327,593 B1 | 12/2001 | Goiffon |
| 6,343,265 B1 | 1/2002 | Glebov et al. |
| 6,374,252 B1 | 4/2002 | Althoff et al. |
| 6,397,232 B1 | 5/2002 | Cheng-Hung et al. |
| 6,424,973 B1 | 7/2002 | Baclawski |
| 6,424,974 B1 | 7/2002 | Cotner et al. |
| 6,497,943 B1 | 12/2002 | Jimarez et al. |
| 6,498,795 B1 | 12/2002 | Zhang et al. |
| 6,513,059 B1 | 1/2003 | Gupta et al. |
| 6,526,416 B1 | 2/2003 | Long |
| 6,532,471 B1 | 3/2003 | Ku et al. |
| 6,560,595 B1 | 5/2003 | Sanders et al. |
| 6,569,207 B1 | 5/2003 | Sundaresan |
| 6,578,046 B2 | 6/2003 | Chang et al. |
| 6,591,272 B1 | 7/2003 | Williams |
| 6,633,869 B1 | 10/2003 | Duparcmeur et al. |
| 6,633,878 B1 | 10/2003 | Underwood |
| 6,640,231 B1 | 10/2003 | Andersen et al. |
| 6,643,633 B2 | 11/2003 | Chau et al. |
| 6,651,244 B1 | 11/2003 | Smith et al. |
| 6,687,873 B1 | 2/2004 | Ballantyne et al. |
| 6,704,744 B1 | 3/2004 | Williamson et al. |
| 6,708,161 B2 | 3/2004 | Tenorio et al. |
| 6,711,579 B2 | 3/2004 | Balakrishnan |
| 6,711,585 B1 | 3/2004 | Copperman et al. |
| 6,718,320 B1 | 4/2004 | Subramanian et al. |
| 6,728,692 B1 | 4/2004 | Martinka et al. |
| 6,732,109 B2 | 5/2004 | Lindberg et al. |
| 6,754,670 B1 | 6/2004 | Lindsay et al. |
| 6,772,031 B1 | 8/2004 | Strand |
| 6,778,990 B2 | 8/2004 | Garcia et al. |
| 6,792,580 B2 | 9/2004 | Kawatkatsu |
| 6,847,974 B2 | 1/2005 | Wachtel |
| 6,871,204 B2 | 3/2005 | Krishnaprasad et al. |
| 6,892,238 B2 | 5/2005 | Lee et al. |
| 6,947,943 B2 | 9/2005 | DeAnna et al. |
| 6,957,214 B2 | 10/2005 | Silberberg et al. |
| 6,978,257 B1 | 12/2005 | Halbout et al. |
| 6,985,905 B2 | 1/2006 | Prompt et al. |
| 6,999,956 B2 | 2/2006 | Mullins |
| 7,007,029 B1 | 2/2006 | Chen |
| 7,024,425 B2 | 4/2006 | Krishnaprasad et al. |
| 7,027,974 B1 | 4/2006 | Busch et al. |
| 7,096,224 B2 | 8/2006 | Murthy et al. |
| 7,111,297 B1 | 9/2006 | Sankaranarayan et al. |
| 7,200,563 B1 | 4/2007 | Hammitt et al. |
| 7,254,589 B2 | 8/2007 | Goodwin et al. |
| 7,278,164 B2 | 10/2007 | Raiz et al. |
| 7,302,410 B1 | 11/2007 | Venkatraman et al. |
| 7,315,849 B2 | 1/2008 | Bakalash et al. |
| 7,475,084 B2 | 1/2009 | Edelstein et al. |
| 7,739,223 B2 * | 6/2010 | Vaschillo et al. ............ 1/1 |
| 2002/0059183 A1 | 5/2002 | Chen |
| 2002/0059187 A1 | 5/2002 | Delo et al. |
| 2002/0099738 A1 | 7/2002 | Grant |
| 2002/0107844 A1 | 8/2002 | Cha et al. |
| 2002/0133484 A1 | 9/2002 | Chau et al. |
| 2002/0169842 A1 | 11/2002 | Christensen et al. |
| 2002/0194154 A1 | 12/2002 | Levy et al. |
| 2003/0018616 A1 | 1/2003 | Wilbanks et al. |
| 2003/0036917 A1 | 2/2003 | Hite et al. |
| 2003/0050932 A1 | 3/2003 | Pace et al. |
| 2003/0110055 A1 | 6/2003 | Chau |
| 2003/0120665 A1 | 6/2003 | Fox et al. |
| 2003/0126136 A1 | 7/2003 | Omoigui |
| 2003/0149934 A1 | 8/2003 | Worden |
| 2003/0163597 A1 | 8/2003 | Hellman et al. |
| 2003/0167445 A1 | 9/2003 | Su et al. |
| 2003/0172368 A1 | 9/2003 | Alumbaugh et al. |
| 2003/0191608 A1 | 10/2003 | Anderson et al. |
| 2003/0233224 A1 | 12/2003 | Marchisio et al. |
| 2004/0010491 A1 | 1/2004 | Riedinger |
| 2004/0054690 A1 | 3/2004 | Hillerbrand et al. |
| 2004/0117346 A1 | 6/2004 | Stoffel et al. |
| 2004/0220893 A1 | 11/2004 | Spivack et al. |
| 2005/0060371 A1 | 3/2005 | Cohen et al. |
| 2005/0080656 A1 | 4/2005 | Crow et al. |
| 2005/0138173 A1 | 6/2005 | Ha et al. |
| 2005/0197926 A1 | 9/2005 | Chinnappan et al. |
| 2005/0267871 A1 | 12/2005 | Marchisio et al. |
| 2006/0218177 A1 | 9/2006 | Chang et al. |
| 2007/0038500 A1 | 2/2007 | Hammitt et al. |
| 2008/0140549 A1 | 6/2008 | Eder |
| 2009/0077051 A1 | 3/2009 | Edelstein et al. |

FOREIGN PATENT DOCUMENTS

| | | |
|---|---|---|
| JP | 2001092827 A | 4/2001 |
| WO | 0115042 A2 | 3/2001 |
| WO | WO 01/15042 A2 | 3/2001 |
| WO | 0205137 A2 | 1/2002 |
| WO | WO 02/05137 A2 | 1/2002 |
| WO | 0231680 A1 | 4/2002 |
| WO | WO 02/31680 A1 | 4/2002 |
| WO | 02080028 A1 | 10/2002 |
| WO | WO 02/080028 A1 | 10/2002 |
| WO | WO 02/099725 A1 | 12/2002 |
| WO | 2005010653 A2 | 2/2005 |
| WO | WO 2005/010653 A2 | 2/2005 |
| WO | 2006020343 A1 | 2/2006 |
| WO | WO 2006/020343 A1 | 2/2006 |
| WO | 2006071928 A2 | 7/2006 |
| WO | WO 2006/071928 A2 | 7/2006 |
| WO | 2007006725 A1 | 1/2007 |

OTHER PUBLICATIONS

Office Action dated Oct. 30, 2008 for U.S. Appl. No. 11/344,545.
Office Action dated Jul. 3, 2008 for U.S. Appl. No. 11/373,340.
Office Action dated Dec. 17, 2008 for U.S. Appl. No. 10/821,464.
Final Office Action dated Feb. 4, 2008 for U.S. Appl. No. 11/165,650.
Office Action dated Aug. 9, 2007 for U.S. Appl. No. 11/165,650.
Office Action dated Oct. 2, 2008 for U.S. Appl. No. 10/637,171.
Office Action dated Mar. 6, 2009 for U.S. Appl. No. 10/637,171.
Office Action dated Apr. 2, 2009 for U.S. Appl. No. 11/219,039.
Office Action dated Mar. 8, 2006 for U.S. Appl. No. 10/340,068.
Final Office Action dated Oct. 23, 2006 for U.S. Appl. No. 10/340,068.
Office Action dated Apr. 3, 2009 for U.S. Appl. No. 11/029,966.
Irani, "Enabling Web Services with BEA WebLogic—Using WebLogic and CapeConnect from CapeClear", Sep. 26, 2001, pp. 1-5. http://www.webservicesarchitect.com/content/articles/irrani05.asp.
Klein et al., "The Relation Between Ontologies and Schema-Languages: Translating OIL-Specifications in XML Schema", Proceedings of the Workshop on Applications of Ontologies and Problem-solving Methods, 14th European Conference on Artificial Intelligence (ECAI 2000, pp. 1-12.
Ruiz, Francisco et al., "A Proposal of a Software Measurement Ontology", Department of Computer Science University of Castilla-La Mancha, Dec. 3, 2008. http://www.frcu.utn.edu.ar/deptos/depto_3/32JAIIO/asse/asse_02.pdf.
Czejdo, B et al. "Automatic Generation of Ontology Based Annotations in XML and Their use in Retrieval Systems", Proceedings of the First International Conference on Web Information Systems Engineering, 2000, vol. 1, pp. 296-300.
Deloule, F et al. "Ontologies and Knowledge Representation", Intelligent Systems for the 21st century, IEEE International Conference on Systems, Man and Cybernetics, 1995, vol. 5, pp. 22-25.
Hu Bo et al. "Ontology-based Medical Image Annotation with Description Logics", proceedings, 15th IEEE International Conference on Tools with Artificial Intelligence, 2003, pp. 77-82.

McGuinness, Deborah L. et al., "DAML+OIL: An Ontology Language for the Semantic Web", IEEE Intelligent Systems, 2002, pp. 72-80.

Wang, Yanmei et al. "Ontology-based Web Knowledge Management", ICICS-PCM 2003, pp. 1859-1863.

Wenjie Li et al. "Ontology Based Intelligent Information Retrieval System", Canadian Conference on Electrical and Computer Engineering, 2004, vol. 1, pp. 373-376.

Abilio Fernandes, SNOBASE, May 2004, 18 pages.

"Knowledge Interchange Format: Draft Proposed American National Standard", http://logic.stanford.edu/kif/dpans.html, 2001.

"Knowledge Interchange Format (KIF)", http://logic.stanford.edu/kif/, 2001.

"The Instances Tab", http://smi-web.stanford.edu/projects/protege/instances.html, 2001.

"The Forms Tab", http://smi-web.stanford.edu/projects/protege/forms.html, 2001.

"The Classes Tab", http://smi-web.stanford.edu/projects/protege/classes.html, 2001.

"What is Protege-2000?", http://smi-web.stanford.edu/projects/protege/classes.html.

"Welcome to the Protege Project", http://smi-web.stanford.edu/projects/protege/, 2001.

Horrocks, "A Denotational Semantics for Standard Oil and Instance Oil", http://www.ontoknowledge.org/oil/down/semantics.pdf, 2000.

Bechhofer et al., "An informal Description of Standard OIL and Instance OIL", http://www.ontoknowledge.org/oil/down/oil-whitepaper.pdf, 2001.

"Welcome to OIL", http://www.ontoknowledge.org/oil, 2001.

Lassila, "Resource Description Framework (RDF) Model and Syntax Specification", 1999, http://www.w3.org/TR/REC-rdf/syntax/.

Lassila, "Introduction to RDF Metadata", http://www.w3.org/TR/NOTE-rdf-simple-intro, 1997.

"Semantic Web Activity: Resource Description Framework (RDF)", 2001, http://www.w3.org/RDF/.

Bechhofer et al., "Terminologies and terminology servers for information environments", Software Technology and Engineering Practice, 1997, Proceedings of the Eighth IEEE International Workshop on Incorporating Computer Aided Software Engineering, London, UK, Jul. 14, 1997, Los Alamitos, CA IEEE Comput. Soc. U.S.., Jul. 14, 1997, pp. 484-497.

"XML Schema Part 2: Datatypes", available at http://www.w3.org/TR/smlschema-2/, Nov. 2001, 6 pages.

Thompson et al., "XML Schema Part 1: Structures, RC3 Recommendation: May 2, 2001", available at: http://www. w3.org/TR/smlschema-1/.

Fallside, "XML Schema Part 0: Primer, RCE Recommendation, May 2, 2001 ", 4 pages, available at http://www.w3.org/TR/smlschema-0/, Nov. 2001.

Clark et al., "XML Path Language (XPath) Version 1.0", Nov. 16, 1999, 4 pages; http://www.w3.org/TR/1/xpath.

Clark, "XSL Transformations (XSLT) Version 1.0", Nov. 16, 1999, 5 pages, http://www.w3.org/TR/xslt.

Bray et al., "Extensible Markup Language (XML) 1.0 (Second Edition)", available at: http://www.w3.org/TR/2000/REC-xml-20001006, Oct. 6, 2000.

Greenhill et al., "Noetica: A Tool for Semantic Data Modelling", Apr. 22, 1998, pp. 1-24.

RDF Code, available at http://www.daml.org/2001/03/daml+oil.daml.

"DAML+OIL", (Mar. 2001), http://www.daml.org/2001/03daml+oil-index.html.

Chiussi et al., "Virtual Queueing Techniques for ABR Service: Improving ABR/VBR Interaction", Bell Laboratories, Lucent Technologies, Holmdel, NJ, IEEE Sixth Annual Joint Conference of the IEEE Computer and Communication Societies, Kobe, Japan, Apr. 7, 1997, pp. 406-418.

Sowa, Knowledge Representation: Logical, Philosophical and Computational Foundations, Brooks/Cole, Pacific Grove, CA 2000.

Oracle 9I SQL Reference, Release 1 (9.0.1), Jun. 2001, Oracle Corporation.

Left Blank Intentionally.

Klein et al., "The Relation between Ontologies and Schema-Languages", Vriji Universiteit Amsterdam, http:www.cs.vu.nl/~mcaklein/papers/oil-xmls.pdf.

Farquhar et al., "The Ontolingua Server: A Tool for Collaborative Ontology Construction", International Journal of Human-Computer Studies, Academic Press, New York, NY, vol. 46, No. 6, 1997, pp. 707-727.

Fikes et al, "Distributed Repositories of Highly Expressive Reusable Ontologies", IEEE Intelligent Systems, IEEE Computer Society, Los Alamitos, California, vol. 14, No. 2, 1999, pp. 73-79.

Dimitrov et al., "XML Standards for Ontology Exchange", Proceedings of Ontolex: Ontologies and Lexical Knowledge Bases, Sep. 8, 2000, pp. 1-68.

EP02006919, European Search Report issued by European Patent Office, Dec. 20, 2006.

Irani, "Enabling Web Services With BEA WebLogic", Sep. 26, 2001, pp. 1-5, http://www.webservicesarchitect.com/content/articles/irani05.asp.

Hu et al., "Ontology-Based Medical Image Annotation with Description Logics", Proceedings 15th IEEE International Conference on Tools with Artificial Intelligence, 2003, pp. 77-82.

Benmohamed et al., "A Control-Theoretic ABR Explicit Rate Algorithm for ATMS Switches with Per-VC Qeueing" 1998. pp. 1-12.

Lin, "Constant-Time Dynamic ATM Bandwidth Scheduling for Guaranteed and Best Effort Services with overbooking", IEEE Infocom 1997, Sixteenth Annual Joint Conference of the IEEE Computer and Communications Societies, Apr. 7, 1997, Kobe, Japan, pp. 398-405.

Ghani et al., "Hierarchical Scheduling for Intergrated ABR/VBR Services in ATM Networks", IEEE Global Telecommunications Conference, Phoenix, AZ, Nov. 3, 1997, pp. 779-784.

"ATM Internetworking", May 1995. pp. 1-26.

"The Virtual LAN Technology Report" 1996. pp. 1-22.

"LAN Emulation Over ATM Version 2—Luni Specification". Jul. 1997. pp. 1-8.

Jin et al., "A Methodology for Acquisition of Software Component Attribute Ontology", The Fourth International Conference on Computer and Information Technology, 2004, pp. 1058-1064.

Ruiz et al., "A Proposal of a Software Measurement Ontology", Department of Computer Science University of Castilla-La Mancha, Dec. 3, 2008, http://frcu.utn.edu.ar/deptos/depto_3/32JAIIO/asse/asse_02.pdf.

Rosemann et al., "Developing a meta model for the Bunge-Wand-Weber ontological Constructs", Information Systems 27, 2002, pp. 75-91.

Green et al., Applying Ontologies to Business and Systems Modeling Techniques and Perspectives: Lessons Learned Journal of Database Management, 15(2), 105-117, Apr.-Jun. 2004 downloaded from: http://www.accessmylibrary.com/coms2/summary_0286-20574539_ITM (1 of 3), Jun. 25, 2009.

Wang et al., "Ontology-based Web Knowledge Management", ICICS-PCM 2003, pp. 1859-1863.

Van Wegen et al, "Measuring the economic value of information systems", Journal of Information Technology (1996) 11, pp. 247-260.

Mena et al., "Observer: An Approach for Query Processing in Global Information Systems Based on Interoperation Across Pre-Existing Ontologies", Cooperative Information Systems, 1996 Proceedings, First IFCIS International Conference on Brussels, Belgium, Jun. 19, 1996, Los Alamitos, CA, IEEE. pp. 14-25.

McGuinness et al., "DAML+OIL: An Ontology Language for the Semantic Web", IEEE Intelligent Systems, 2002, pp. 1-9.

USPTO Official Office Action, U.S. Appl. No. 11/182,455, dated Apr. 29, 2008.

USPTO Notice of Allowance, U.S. Appl. No. 11/182,455, dated Mar. 17, 2001.

USPTO Notice of Allowance, U.S. Appl. No. 11/182,455, dated Nov. 26, 2007.

USPTO Notice of Allowance, U.S. Appl. No. 11/182,455, dated Aug. 13, 2008.

USPTO Official Office Action, U.S. Appl. No. 12/141,637, dated Sep. 9, 2010.

USPTO Notice of Allowance, U.S. Appl. No. 12/141,637, dated Feb. 7, 2011.

USPTO Official Office Action, U.S. Appl. No. 11/373,340, dated Jul. 3, 2008.

USPTO Notice of Allowance, U.S. Appl. No. 11/373,340, dated Jan. 8, 2009.
USPTO Official Office Action, U.S. Appl. No. 11/344,545, dated May 1, 2009.
USPTO Official Office Action, U.S. Appl. No. 11/344,545, dated Oct. 30, 2008.
USPTO Notice of Allowance, U.S. Appl. No. 11/165,650, dated Nov. 23, 2010.
"About the DAML Language", located at http://www.daml.org/about.html.
"The DARPA Agent Markup Language Homepage", 2 pages, located at http://www.daml.org/.
"SQL (Structured Query Language)", definition from Wikipedia, the free encyclopedia, 12 pages.
Greenhill et al., "IO-Port.net Database", 1998, p. 1.
Deloule et al., "Ontologies & Knowledge Representation" IEEE, 1995. pp. 1-6.
Fernandes, "Topicos em Bancos de Dados", May 2004, pp. 1-18.
USPTO Notice of Allowance, U.S. Appl. No. 09/866,101, dated Jan. 13, 2006.
USPTO Official Office Action, U.S. Appl. No. 09/866,101, dated Jul. 6, 2005.
USTPO Notice of Allowance, U.S. Appl. No. 09/904,457, dated Nov. 3, 2005.
USPTO Official Office Action, U.S. Appl. No. 09/904,457, dated Nov. 18, 2004.
USPTO Official Office Action, U.S. Appl. No. 09/904,457, dated Mar. 15, 2004.
USPTO Official Office Action, U.S. Appl. No. 09/904,457, dated Apr. 4, 2005.
USPTO Official Office Action, U.S. Appl. No. 11/165,650, dated Aug. 9, 2007.
USPTO Official Office Action, U.S. Appl. No. 10/053,045, dated May 3, 2006.
USPTO Official Office Action, U.S. Appl. No. 10/053,045, dated Feb. 12, 2007.
USPTO Official Office Action, U.S. Appl. No. 10/053,045, dated Sep. 28, 2005.
USPTO Official Office Action, U.S. Appl. No. 10/053,045, dated Sep. 1, 2006.
USPTO Official Office Action, U.S. Appl. No. 10/104,785, dated Dec. 15, 2005.
USPTO Official Office Action, U.S. Appl. No. 10/104,785, dated Feb. 18, 2005.
USPTO Official Office Action, U.S. Appl. No. 10/104,785, dated Jul. 21, 2005.
USPTO Notice of Allowance, U.S. Appl. No. 10/104,785, dated Apr. 24, 2006.
USPTO Official Office Action, U.S. Appl. No. 10/159,516, dated Nov. 9, 2006.
USPTO Official Office Action, U.S. Appl. No. 10/159,516, dated Sep. 7, 2005.
USPTO Official Office Action, U.S. Appl. No. 10/159,516, dated Jun. 7, 2006.
Czejdo et al., "Automatic Generation of Ontology Based Annotations in XML and their use in retrieval systems, Proceedings of the first international conference on web information Systems engineering", 2000. pp. 296-300.
USPTO Notice of Allowance, U.S. Appl. No. 10/159,516, dated Apr. 5, 2005.
USPTO Notice of Allowance, U.S. Appl. No. 10/302,370, dated Feb. 4, 2009.
USPTO Notice of Allowance, U.S. Appl. No. 10/302,370, dated Jun. 30, 2009.
USPTO Official Office Action, U.S. Appl. No. 10/340,068, dated Oct. 23, 2006.
USPTO Official Office Action, U.S. Appl. No. 10/340,068, dated Mar. 8, 2006.
USPTO Official Office Action, U.S. Appl. No. 10/637,339, dated Mar. 27, 2007.
USPTO Official Office Action, U.S. Appl. No. 10/637,339, dated Sep. 22, 2006.
USPTO Official Office Action, U.S. Appl. No. 10/637,339, dated Apr. 7, 2006.
USPTO Notice of Allowance, U.S. Appl. No. 10/637,339, dated Jun. 2, 2010.
USPTO Official Office Action, U.S. Appl. No. 10/637,171, dated Nov. 23, 2009.
USPTO Official Office Action, U.S. Appl. No. 10/637,171, dated Mar. 6, 2009.
USPTO Official Office Action, U.S. Appl. No. 10/821,464, dated Jul. 2, 2009.
USPTO Official Office Action, U.S. Appl. No. 10/821,464, dated Dec. 17, 2008.
USPTO Official Office Action, U.S. Appl. No. 11/026,358, dated Dec. 18, 2007.
USPTO Official Office Action, U.S. Appl. No. 11/026,358, dated Jun. 5, 2007.
USPTO Official Office Action, U.S. Appl. No. 11/029,966, dated Feb. 19, 2010.
USPTO Official Office Action, U.S. Appl. No. 11/029,966, dated Jun. 21, 2010.
USPTO Official Office Action, U.S. Appl. No. 11/029,966, dated Jul. 8, 2009.
USPTO Official Office Action, U.S. Appl. No. 11/029,966, dated Apr. 3, 2009.
USPTO Notice of Allowance, U.S. Appl. No. 11/029,966, dated Dec. 8, 2010.
USPTO Official Office Action, U.S. Appl. No. 11/219,039, dated Mar. 17, 2011.
USPTO Official Office Action, U.S. Appl. No. 11/219,039, dated Oct. 5, 2010.
USPTO Notice of Allowance, U.S. Appl. No. 11/134,725, dated Jan. 24, 2008.
USPTO Notice of Allowance, U.S. Appl. No. 11/134,725, dated Aug. 15, 2007.
USPTO Notice of Allowance, U.S. Appl. No. 11/134,725, dated Jul. 22, 2008.
USPTO Official Office Action, U.S. Appl. No. 11/165,650, dated Feb. 4, 2008.
USPTO Official Office Action, U.S. Appl. No. 11/165,650, dated Apr. 16, 2010.

* cited by examiner

Mappings To Class: Order
Package: <Orders>

RDBMS Schemas

Order Mapped to: 2 Sources

| Schema Name | Database Name | Mapped Table |
|---|---|---|
| Shipping | Logistics | PurchaseOrder |

Order.customer Mapped to: 5 Sources (2 directly)

| Schema Name | Database Name | Mapped Concept | Property Path |
|---|---|---|---|
| Shipping | Logistics | FK:FK_PurchaseOrder_PurchaseOrderEntry (purchaseOrderEntryID) | Order.customer (Customer) |

Order.date Mapped to: 0 Sources

Not Mapped

Order.id Mapped to: 3 Sources (3 directly)

| Schema Name | Database Name | Mapped Concept | Property Path |
|---|---|---|---|
| Shipping | Logistics | PurchaseOrder.id | Order.id (Integer) |

Order.items Mapped to: 3 Sources (3 directly)

Not Mapped

Order.total Mapped to: 3 Sources (2 directly)

| Schema Name | Database Name | Mapped Concept | Property Path |
|---|---|---|---|
| Shipping | Logistics | PurchaseOrder.totalcost | Order.total.scientificRepresentation (String) |

XML Schemas

Order Mapped to: 2 Sources

| Schema Name | Concept | Complex Type | Concept X-Path |
|---|---|---|---|
| orderTargetNS | Complex Type | | /Shipment |

*FIG. 8*

DATA QUERY AND LOCATION THROUGH A CENTRAL ONTOLOGY MODEL

CROSS REFERENCES TO RELATED APPLICATIONS

This application is a continuation of application Ser. No. 11/134,725, filed May 20, 2005, status allowed.

This application is a continuation-in-part of assignee's pending application U.S. Ser. No. 10/104,785, now U.S. Pat. No. 7,146,399, filed on Mar. 22, 2002, entitled "Run-Time Architecture for Enterprise Integration with Transformation Generation," which is a continuation-in-part of application U.S. Ser. No. 10/053,045, now abandoned, filed on Jan. 15, 2002, entitled "Method and System for Deriving a Transformation by Referring Schema to a Central Model," which is a continuation-in-part of assignee's application U.S. Ser. No. 09/904,457, now U.S. Pat. No. 7,093,200, filed on Jul. 6, 2001, entitled "Instance Brower for Ontology," which is a continuation-in-part of assignee's application U.S. Ser. No. 09/866,101, now U.S. Pat. No. 7,099,885, filed on May 25, 2001, entitled "Method and System for Collaborative Ontology Modeling."

FIELD OF THE INVENTION

The present invention relates to data processing; specifically to querying of data sources and locating data within data sources.

BACKGROUND OF THE INVENTION

Ontology provides a way to model things that exist. Basic constructs of an ontology model are classes, properties thereof and inheritance. Classes are sets, the elements of which are referred to as instances of the class. For example, a class People is a set of instances that represent specific people. A property, p, of a class is a function p: $C \rightarrow D$ from a class C, referred to as the source of p, to a class D, referred to as the target of p. The classes C and D may be the same class of different classes. When it is important to distinguish between properties defined on different classes, the notation C.p is used to denote a property, p, defined on C.

Properties may be composed, so that if p: $C \rightarrow D$ and q: $D \rightarrow E$, then the composition qop: $C \rightarrow E$ has source C and target E. The composition is denoted by C.p.q.

A class C is said to be a subclass of D if $C \subset$, in which case D is also said to be a superclass of C. In this case, every instance of C is also an instance of D, and properties defined on D are also defined on C by inheritance. For example, a class named Passengers may be a subclass of a class named People. A property such as firstName, defined on People is inherited by Passengers.

A special class named Being is defined in an ontology model as a universal class that contains all classes as subclasses thereof. Properties defined on Being are thus inherited by all classes in the ontology model.

Certain properties, referred to as "representations," take on concrete fundamental alphanumeric values. The significance of representations is that they are properties one can reason about using arithmetic, logical and string operators, since their type corresponds to the types of mathematical expressions and programming language expressions.

In order to accommodate and provide values for representations, a special class Values is preferably created, so as to include all possible fundamental values a property may have. In addition, a special class Formats is also created, to include formats in which instances of Values can be expressed. Formats include inter alia conventional integer formats, real number formats, character string formats and date and time formats. A function representation: Values×Formats→ Alphanumerics, converts a value into an alphanumeric string according to a specific format. For example, if lastName: People→Values, then representation (person.lastName, title-Case)="Smith" (a character string), for an instance, person, of People corresponding to John Smith. Observe that lastName is a representation, and titleCase is a format.

Alternatively, various formats can be modeled as properties on the class Values, or subclasses thereof. With respect to this alternative model design choice, the last name of John Smith represented as a character string in title case is denoted person.lastName.titleCase. Observe that lastName and title-Case are both representations in this alternative model.

Applicant's co-pending application U.S. Ser. No. 10/053, 045, filed on Jan. 15, 2002 and entitled "Method and System for Deriving a Transformation by Referring Schema to a Central Model" describes mapping data schema, including inter alia relational database schema and XML schema, into a central ontology model. Basic constructs of the data schema are mapped to classes, properties and compositions of properties in the central ontology model. Thus, for relational database schema, tables are generally mapped to ontology classes, and fields of tables are generally mapped to ontology properties or compositions of properties—more specifically, to properties or compositions of properties with target Values. Similarly, for XML schema, complex types are generally mapped to ontology classes, and elements and attributes within complex types are generally mapped to ontology properties or compositions of properties.

Enterprise data systems, especially for large enterprises, typically include multiple data sources that may be compliant with different data schemas. Indeed, as a result of several generations of IT and/or mergers and acquisitions, several databases with different schemas may contain information on the same functional area of the business. For example, enterprise employment data may be stored in relational databases conforming to a first relational database schema, enterprise accounting data may be stored in relational databases conforming to a second relational database schema, enterprise sales forecasts may be stored in relational databases conforming to a third relational database schema, enterprise inventory data may be stored in XML documents conforming to a first XML schema, and enterprise bill of materials data may be stored in XML documents conforming to a second XML schema. Often these various data sources may overlap, and it is difficult for a user to query across the enterprise data sources. For example, a user may want to know the bills of materials for items that need to be replenished in inventory based on demand forecasts.

There is thus a need for a unified querying tool that enables a user to query across data sources conforming to disparate data schemas.

The need for a unified querying tool also arises with one or multiple data sources, when engineers involved in application development, enterprise application integration or data warehousing may not be aware of the precise semantics of a database, and may therefore be unable to use its data appropriately.

The need for a unified querying tool also arises when a single question crosses multiple data sources.

Another difficulty faced by enterprises is being able to locate data within multiple data sources. With reference to the example above, a user may want to locate data sources containing employee stock option data. Such data may be distributed over multiple data sources, and may involve joining relational database tables that conform to different data schema.

There is thus a need for a data locator tool that enables a user to specify data of interest, and receive a list of constructs corresponding to the data of interest, and the various data sources containing data for such constructs.

The need for a data locator tool also arises when trying to locate overlaps, where a single aspect of enterprise information is stored in multiple locations. Such overlaps signal the potential for bad data quality, as they generally lead to inconsistencies.

SUMMARY OF THE INVENTION

Certain embodiments of the present invention provide a method and system for unified querying of data sources conforming to possibly disparate data schemas by use of a central ontology model into which the data schemas are embedded. In a preferred embodiment, the present invention uses an ontology query language for expressing queries about an ontology. Certain embodiments of the present invention enable a user to ask a question using an agreed business vocabulary for an ontology, and ensures that this question is translated accurately into a query on the underlying data sources.

Using mappings of the data schemas into the central ontology model, certain embodiments of the present invention convert a query referring to the central ontology model into a corresponding query referring to a data schema that is embedded within the central ontology model. Thus a user can build a generic query referring to the central ontology model, and convert it to queries that can be executed on various data sources. In a preferred embodiment, the present invention uses a query builder tool for generating queries referring to an ontology.

The present invention also provides a method and system for data location. In a preferred embodiment, a user can select a class or property from a central ontology model, and locate constructs in various data schema that correspond to his selection, as well as locations of data sources that contain data for such constructs.

Certain embodiments of the present invention enable a user to locate overlaps, where a single aspect of enterprise information is stored in multiple locations. The present invention can be used to identify ontology constructs that are mapped to too many different data sources. For example, the present invention can be used inter alia to highlight constructs that are mapped more than a given number, n, times.

There is thus provided in accordance with an embodiment of the present invention a data query system including a first storage medium including a data schema having a data schema query language associated therewith, a second storage medium including an ontology model including classes and properties, the ontology model having an ontology query language associated therewith, wherein constructs of the data schema are mapped to corresponding classes, properties or compositions of properties of the ontology model, and an ontology query processor generating a query expressed in the data schema query language corresponding to a specified query expressed in the ontology query language.

There is further provided in accordance with an embodiment of the present invention a method for data query including providing a data schema having a data schema query language associated therewith, providing an ontology model including classes and properties, the ontology model having an ontology query language associated therewith, wherein constructs of the data schema are mapped to corresponding classes, properties or compositions of properties of the ontology model, providing a query expressed in the ontology language, and generating a query expressed in the data schema query language corresponding to the query expressed in the ontology query language.

There is yet further provided in accordance with an embodiment of the present invention a data locator system including at least one first storage medium including at least one data schema, a second storage medium including an ontology model including classes and properties, wherein constructs of the at least one data schema are mapped to corresponding classes, properties or compositions of properties of the ontology model, and a data locator identifying constructs of the at least one data schema corresponding to specific classes or properties of the ontology model.

There is moreover provided in accordance with an embodiment of the present invention a method for data location including providing at least one data schema, providing an ontology model including classes and properties, wherein constructs of the at least one data schema are mapped to corresponding classes, properties or compositions of properties of the ontology model, and identifying constructs of the at least one data schema corresponding to specific classes or properties of the ontology model.

There is additionally provided in accordance with an embodiment of the present invention an ontology query system, including a storage medium providing an ontology model including classes and properties, and a query builder generating an ontology query, the ontology query including a first clause indicating at least one subject class to which the query applies, and a second clause indicating at least one property or composition of properties defined on the at least one subject class, values of which are to be displayed.

There is further provided in accordance with an embodiment of the present invention a method for querying ontological data, including providing an ontology model including classes and properties, and generating an ontology query, the ontology query including a first clause indicating at least one subject class to which the query applies, and a second clause indicating at least one property or composition of properties defined on the at least one subject class, values of which are to be displayed.

There is yet further provided in accordance with an embodiment of the present invention a data descriptor propagation system including at least one first storage medium including at least one data schema and at least one data source conforming to the at least one data schema, a second storage medium including an ontology model including classes and properties, wherein constructs of the at least one data schema are mapped to corresponding classes, properties or compositions of properties of the ontology model, and a data descriptor propagator associating descriptors with data for data schema constructs in the at least one data source, corresponding to descriptors associated with corresponding classes and properties of the ontology system.

There is moreover provided in accordance with an embodiment of the present invention a method for data descriptor propagation including providing at least one data schema and at least one data source conforming to the at least one data schema, providing an ontology model including classes and properties, wherein constructs of the at least one data schema are mapped to corresponding classes, properties or compositions of properties of the ontology model, and associating descriptors with data for data schema constructs in the at least one data source, corresponding to descriptors associated with corresponding classes and properties of the ontology system.

There is additionally provided in accordance with an embodiment of the present invention an ontology modeling system including at least one data construct for container classes for modeling sets, bags and lists, at least one data construct for modeling multi-valued properties whose targets are said container classes, and at least one data construct for imposing constraints on the multi-valued properties.

There is further provided in accordance with an embodiment of the present invention a COBOL mapping system for embedding a COBOL Copy Book including group items and elementary items into an ontology model including classes and properties, including at least one data construct for mapping at least one COBOL group item within a COBOL Copy Book to at least one class of an ontology model, and at least one data construct for mapping at least one COBOL elementary items within the COBOL Copy Book to at least one property or composition of properties of the ontology model There is yet further provided in accordance with an embodiment of the present invention a method for embedding a COBOL Copy Book including group items and elementary items into an ontology model including classes and properties, including mapping at least one COBOL group item within a COBOL Copy Book to at least one class of an ontology model, and at least one data construct for mapping at least one COBOL elementary items within the COBOL Copy Book to at least one property or composition of properties of the ontology model.

Other embodiments of the invention are also described, including, for example, computer readable medium (or media) containing executable computer program instructions, which when executed by a digital processing system, such as a general purpose computer having at least one microprocessor and memory and a bus, cause the system to perform one or more methods described herein. The medium may be a magnetic medium (e.g. a hard disk in a drive) or an optical medium (e.g. a CD-ROM).

BRIEF DESCRIPTION OF THE DRAWINGS

The present invention will be more fully understood and appreciated from the following detailed description, taken in conjunction with the drawings in which:

FIG. 8 is an illustration of a visual display for displaying data location results, in accordance with a preferred embodiment of the present invention;

DETAILED DESCRIPTION OF A PREFERRED EMBODIMENT

Certain embodiments of the present invention concern querying of data sources, and data location within the sources, through use of a central ontology model. Specifically, certain embodiments of the present invention use an ontology query language for expressing queries relating to an ontology, and a query conversion tool for converting such queries into corresponding queries relating to data schemas that are embedded within the ontology. The present invention, in one embodiment, can enable a user to ask a question using an agreed business vocabulary for an ontology, and ensures that this question is translated accurately into a query on the underlying data sources.

The present invention also uses, in certain embodiments, a data locator for locating data corresponding to specified classes and properties of an ontology, within data sources that conform to data schemas that are embedded within the ontology.

Figure 1:
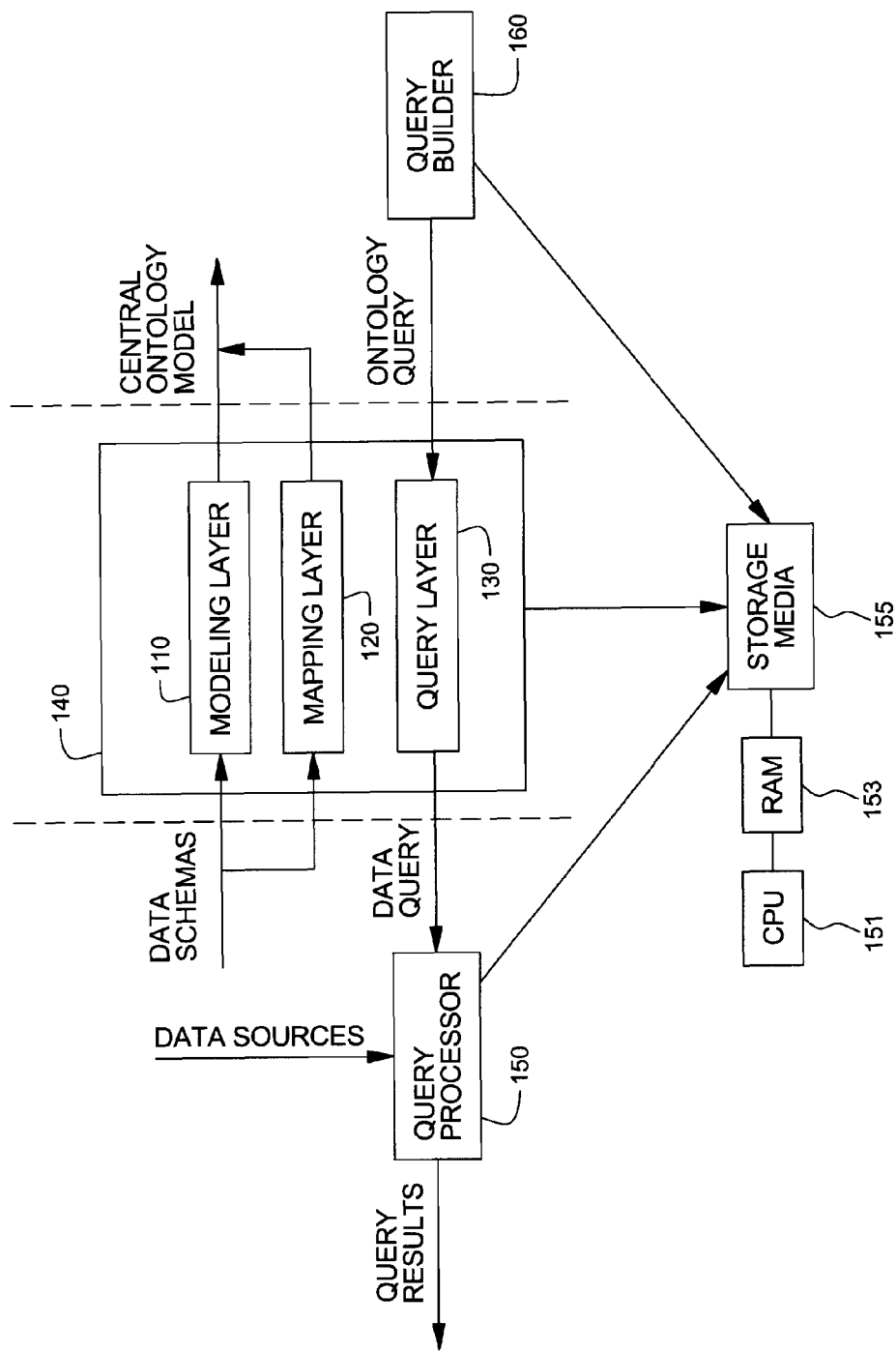
FIG. 1 is a simplified block diagram of a data query system, in accordance with a preferred embodiment of the present invention.

Reference is now made to FIG. 1, which is a simplified block diagram of a data query system, in accordance with a preferred embodiment of the present invention. Shown in FIG. 1 is a modeling layer 110, which enables a user to generate a central ontology model into which one or more data schemas can be embedded. While generating the central ontology model, the user preferably also maps constructs of the data schemas into corresponding classes, properties and compositions of properties in the central ontology model, through use of a mapping layer 120. Modeling and mapping layers are described in applicant's now abandoned application, U.S. Ser. No. 10/053,045, referenced hereinabove, the contents of which are hereby incorporated by reference.

FIG. 1 is divided by dashed vertical lines into a left part, a middle part and a right part. The left part relates to the data schemas and data sources, and the right part relates to the central ontology. The middle part relates to an engine that maps items from the left part to the right part, or vice versa.

A query layer 130 processes a query expressed in an ontology language and generates a corresponding query expressed in a data schema language. Modules 110, 120 and 130 may comprise computer programs. Together, modules 110, 120 and 130 may reside on a computer readable storage media 155 for execution by a CPU 151 via a computer readable memory 153 within a single computer 140 for local computing, or may be distributed among a plurality of computers for distributed computing.

A query processor 150, comprising a computer program, is used to execute the query expressed in the data schema language on one or more data sources. In a preferred embodiment of the present invention, the query expressed in a data schema language is generated through an ontology query builder 160 comprising a computer program. Query processor 150 and query builder 160 comprise computer programs stored on computer readable storage media 155 for execution by CPU 151 via computer readable memory 153".

Figure 2:
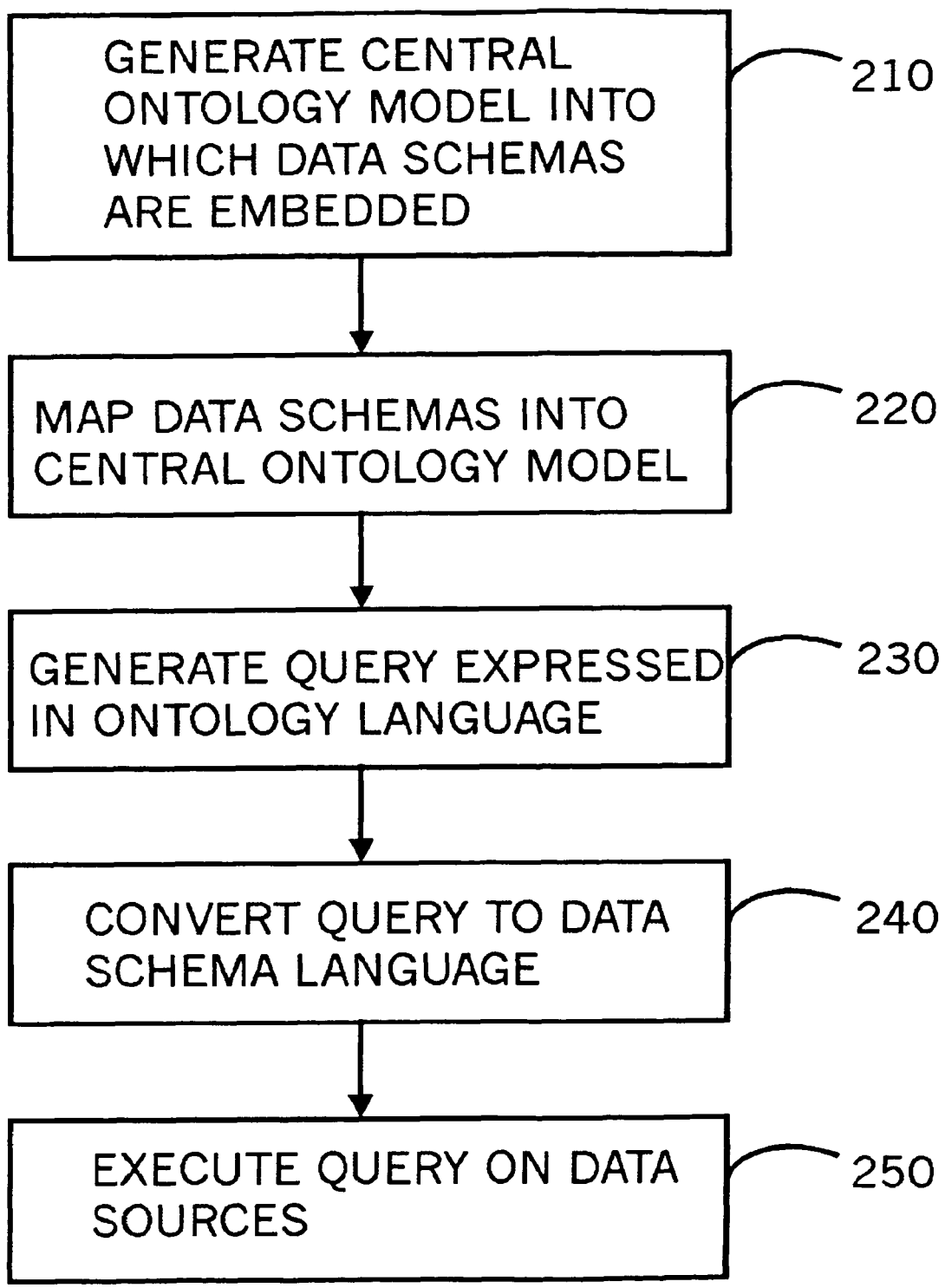
FIG. 2 is a simplified flowchart of a method for querying .data source, in accordance with a preferred embodiment of the present invention.

Reference is now made to FIG. 2, which is a simplified flowchart of a method for querying data source, in accordance with a preferred embodiment of the present invention. At step 210 a central ontology model into which one or more given data schemas are embedded is generated. At step 220 constructs of the given data schemas are mapped into classes, properties and compositions of properties of the central ontology model. At step 230 a query expressed in an ontology query language is generated. At step 240 the query expressed in the ontology query language is converted to a query expressed in a data schema language. At step 250 the query expressed in the data schema language is executed on one or more data sources.

Figure 3:
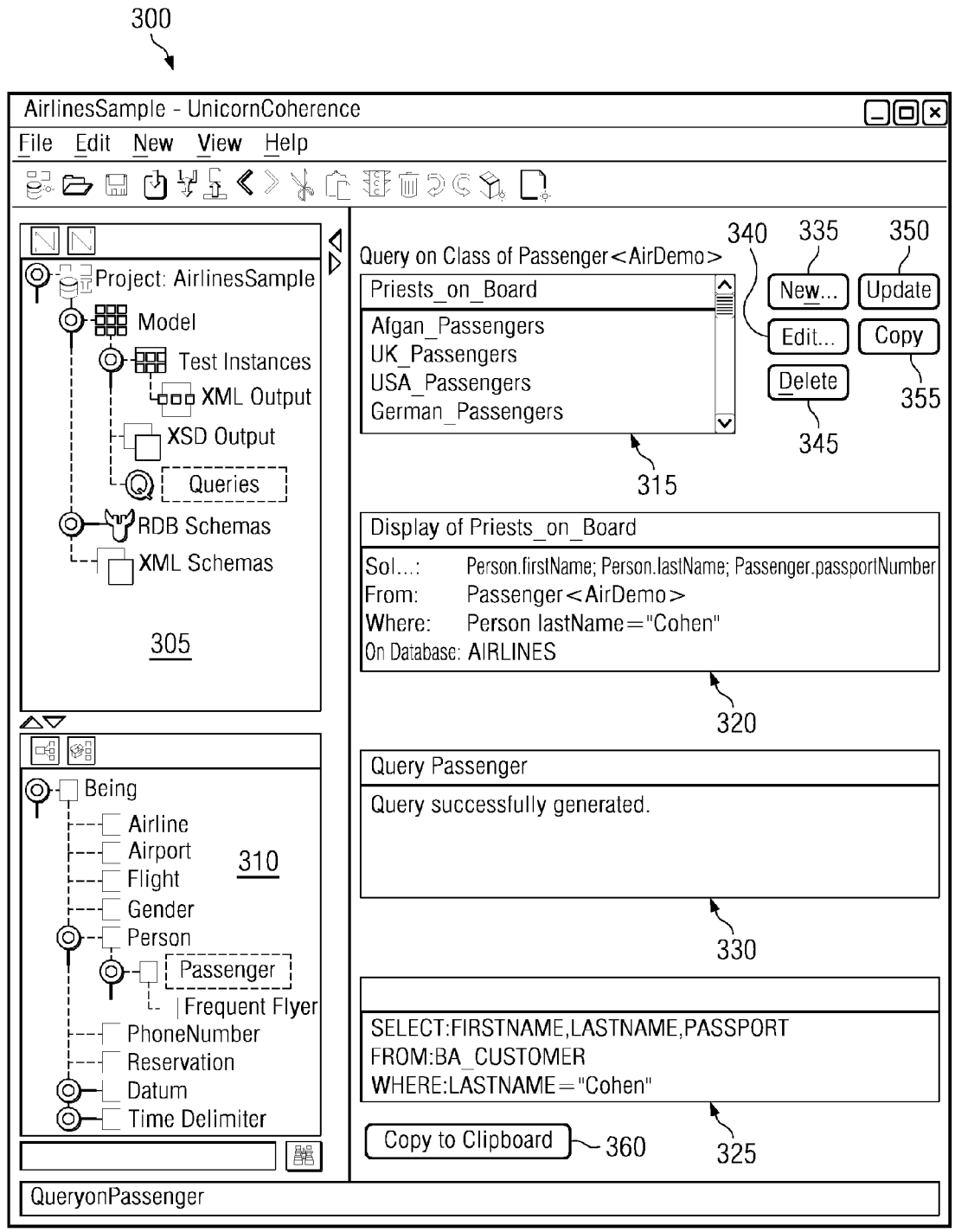
FIG. 3 is an illustration of a user interface for converting a query expressed in an ontology query language to a corresponding query expressed in a data schema query language, in accordance with a preferred embodiment of the present invention.

Reference is now made to FIG. 3, which is an illustration of a user interface for converting a query expressed in an ontology query language to a corresponding query expressed in a data schema query language, in accordance with a preferred embodiment of the present invention. Shown in FIG. 3 is a window 300 containing various panes. An upper left pane 305 displays components of a project named AirlinesSample. Shown highlighted in pane 305 is a "Queries" component. A lower left pane 310 displays an ontology model in a class hierarchical view. Pane 310 indicates that all classes inherit from a superclass named Being, and that a class named Person contains a subclass named Passenger, which contains a further subclass named FrequentFlyer. Shown highlighted in pane 310 is the class Passenger, which is the subject class for queries are displayed in the right-hand panes.

Specifically, upper right pane 315 displays a list of various queries on the class Passenger that already exist. Shown highlighted in pane 315 is a query named Priests_on_Board. Each query listed in pane 315 is expressed in an ontology query language. A pane 320 displays the query highlighted in pane 315 in the ontology query language. In a preferred embodiment of the present invention, a query expressed in the ontology query language includes three clauses. A first clause, designated as SELECT indicates one or more properties to be displayed. A second clause, designated as FROM indicates one or more subject class on which the properties are defined. A third clause, designated as WERE indicates one or more conditions satisfied by one or more values of properties defined on the subject class. The three clauses for the Priests_on_Board query are displayed in a pane 320. Those skilled in the art will appreciate that the SELECT, FROM and WHERE clauses resemble their SQL counterparts. In a preferred embodiment of the present invention, an ontology query also includes a clause indicating a database for which the query is intended as shown in pane 320.

A bottom right pane 325 displays a query expressed in a data schema language, which corresponds to the query displayed in pane 320. Specifically, in FIG. 3 pane 325 displays an SQL query for the database AIRLINES, which corresponds to the query Priests_on_Board in pane 320. The system of the present invention preferably converts the query in pane 320 to the query in pane 325 using the mapping from the relational database schema AIRLINES into the ontology model AirlinesSample.

A pane 330 is used to display system messages regarding the process of conversion from the query of pane 320 to the query of pane 325.

Various buttons are provided in window 300 for user interaction. Buttons 335, 340, 345, 350 and 355 relate to pane 315 and the list of queries displayed therein. Button 335 enables a user to build a new query for the class Passenger. Upon clicking on button 335, a user interface for building queries is preferably invoked. Such a user interface is described with respect to FIG. 4 hereinbelow.

Button 340 enables a user to edit an existing query on the class Passenger. Button 345 enables a user to delete an existing query. Button 350 enables a user to update the SQL query displayed in pane 325 by re-executing the process that generates the SQL query from the ontology query. A button 355 enables a user to copy an existing query, for use inter alia in building a new query or editing an existing query. Finally, a button 360 is provided under pane 325 for copying a query displayed therein to a clipboard, preferably for input to a database application that executes the query on one or more data sources.

As can be seen in FIG. 3, the ontology language query

---

SELECT: Person.firstName, Person.lastName, Passenger.passportNumber
FROM: Passenger<AirDemo>
WHERE: Person.lastName = "Cohen"
ON DATABASE: Airlines

--- is converts to the SQL query
SELECT FIRSTNAME, LASTNAME, PASSPORT
FROM BA_CUSTOMER
WHERE LASTNAME="Cohen"
on the database AIRLINES. The table BA_CUSTOMER corresponds to the ontology class Passenger, and the fields FIRSTNAME, LASTNAME and PASSPORT of table BA_CUSTOMER correspond respectively to the properties firstName, lastName and passportNumber of class Passenger.

Figure 4:
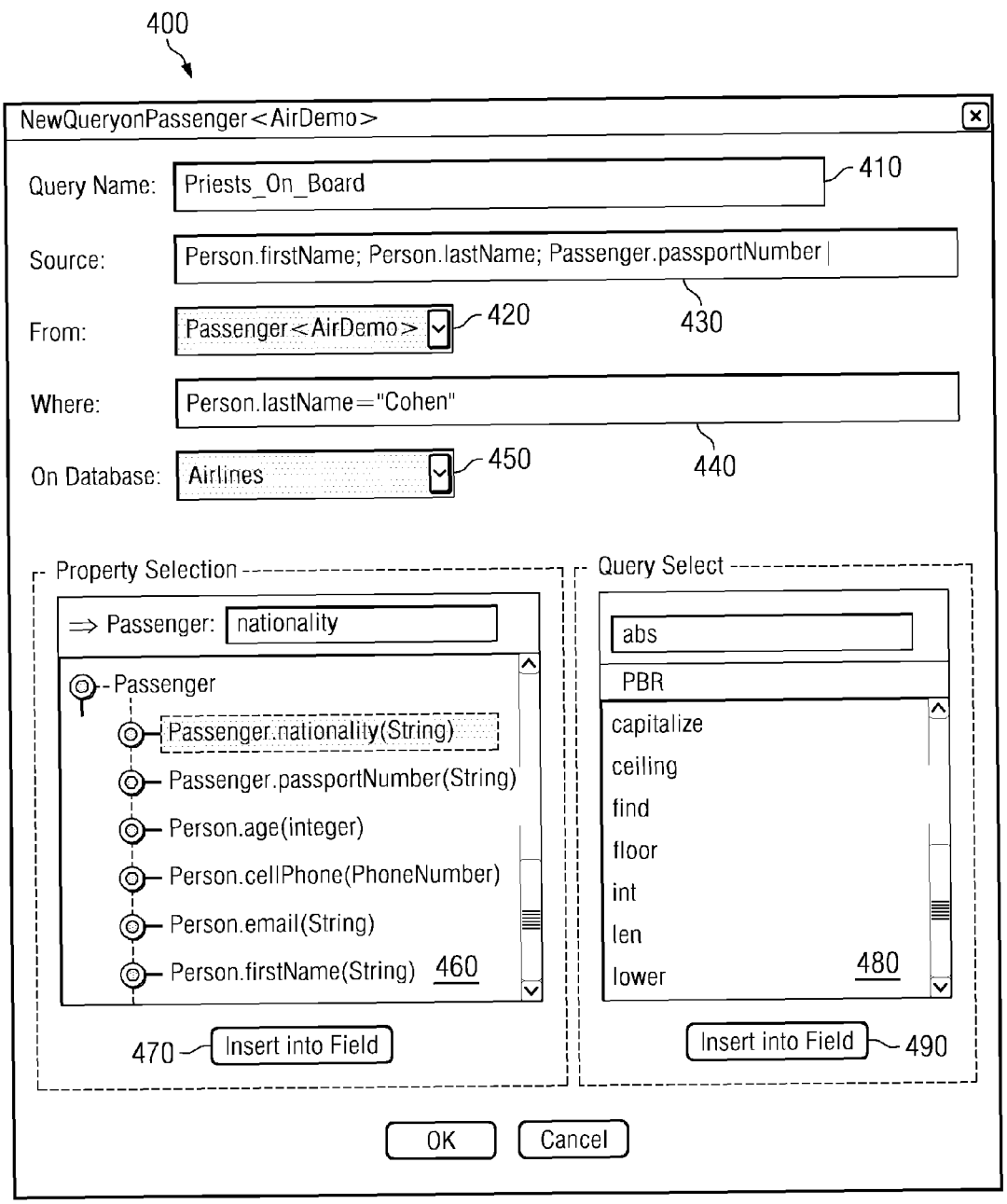
FIG. 4 is an illustration of a user interface for generating a query expressed in an ontology query language, in accordance with a preferred embodiment of the present invention.

Reference is now made to FIG. 4, which is an illustration of a user interface for generating a query expressed in an ontology query language, in accordance with a preferred embodiment of the present invention. Shown in FIG. 4 is a window 400 used for filling in the SELECT, FROM and WHERE clauses of a query on an ontology class. A field 410 is provided to specify a name for the query. Fields 420, 430 and 440 are provided to enter three clauses of the query. The entries in these fields correspond to the query displayed in pane 320 of FIG. 3. Field 450 is provided to specify one or more databases on which the query is intended to be applied. In a preferred embodiment, the system of the present invention converts the query specified in fields 420, 430, 440 to a database query on the one or more databases specified in field 450. Such a converted query is displayed in pane 325 of FIG. 3.

To assist a user in filling in fields 420, 430 and 440, a lower left pane 460 displays a list of properties defined on the class Passenger. It is noted that some of these properties, such as Person.firstName, are inherited from the superclass Person. Preferably, a user selects a desired property from the list displayed in pane 440, and uses an "Insert into Field" button 470 to insert the selected property into field 420 or field 440. Similarly, a lower right pane 480 displays a list of operators that can be used within conditions in the "Where:" clause. A user clicks on an "Insert into Field" button 490 to insert the selected operator into field 440.

Figure 5:
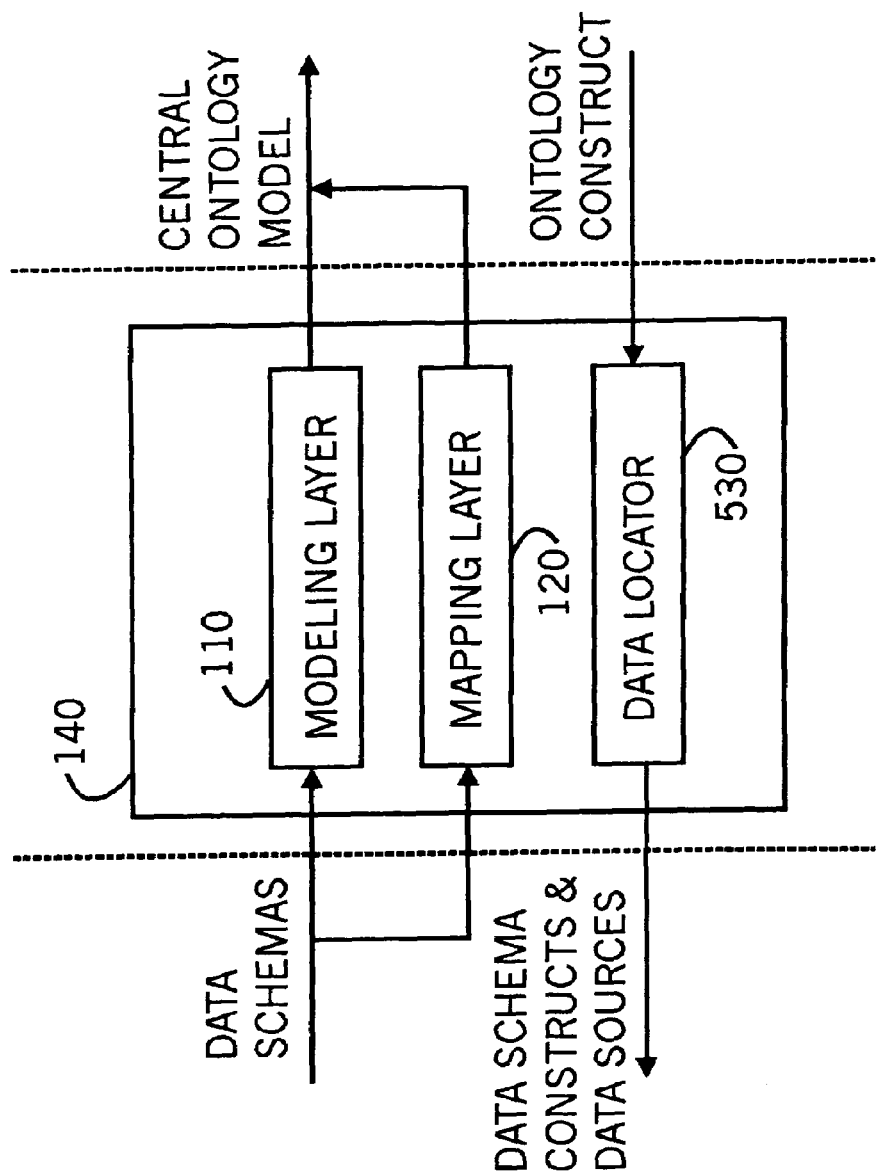
FIG. 5 is a simplified block diagram of a data locator system, in accordance with a preferred embodiment of the present invention.

Reference is now made to FIG. 5, which is a simplified block diagram of a data locator system, in accordance with a preferred embodiment of the present invention. FIG. 5 includes modeling layer 110 and mapping layer 120 from the system illustrated in FIG. 1. As in FIG. 1, FIG. 5 is also divided into three parts by dashed vertical lines; namely, data schemas and data sources on the left, central ontology model on the right, and an engine in the middle that maps items from the left to the right or vice versa.

FIG. 5 includes a data locator 530, used to identify data schema constructs corresponding to specified classes and properties of the ontology, and to identify data sources having data for such constructs.

Figure 6:
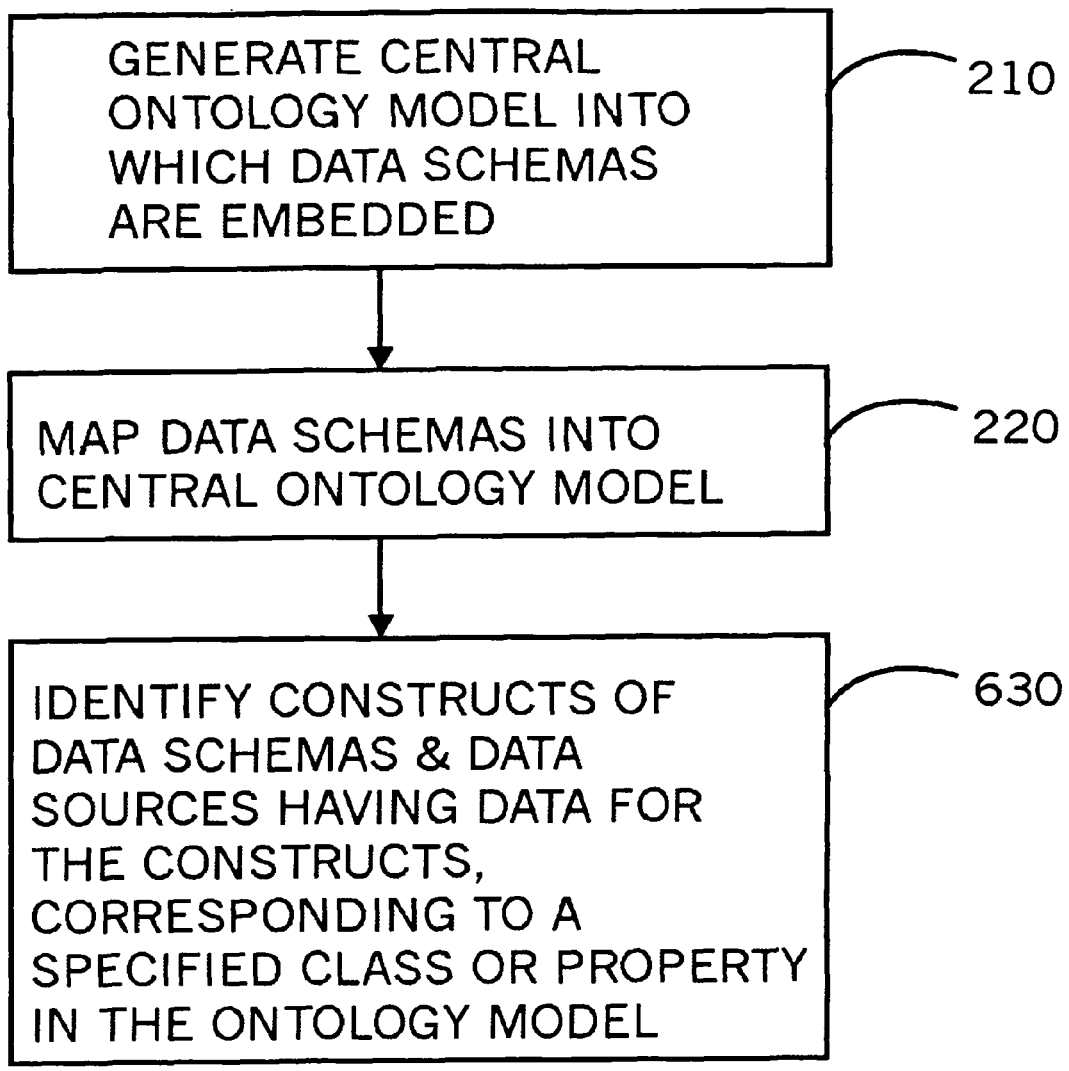
FIG. 6 is a simplified flowchart of a method for locating data, in accordance with a preferred embodiment of the present invention.

Reference is now made to FIG. 6, which is a simplified flowchart of a method for locating data, in accordance with a preferred embodiment of the present invention. FIG. 6 includes steps 210 and 220 from the flowchart of FIG. 2. At step 630 constructs of the data schemas that map to one or more specified classes or properties of the central ontology model are identified. In a preferred embodiment of the present invention, data sources that have data for such constructs are also identified.

Figure 7:
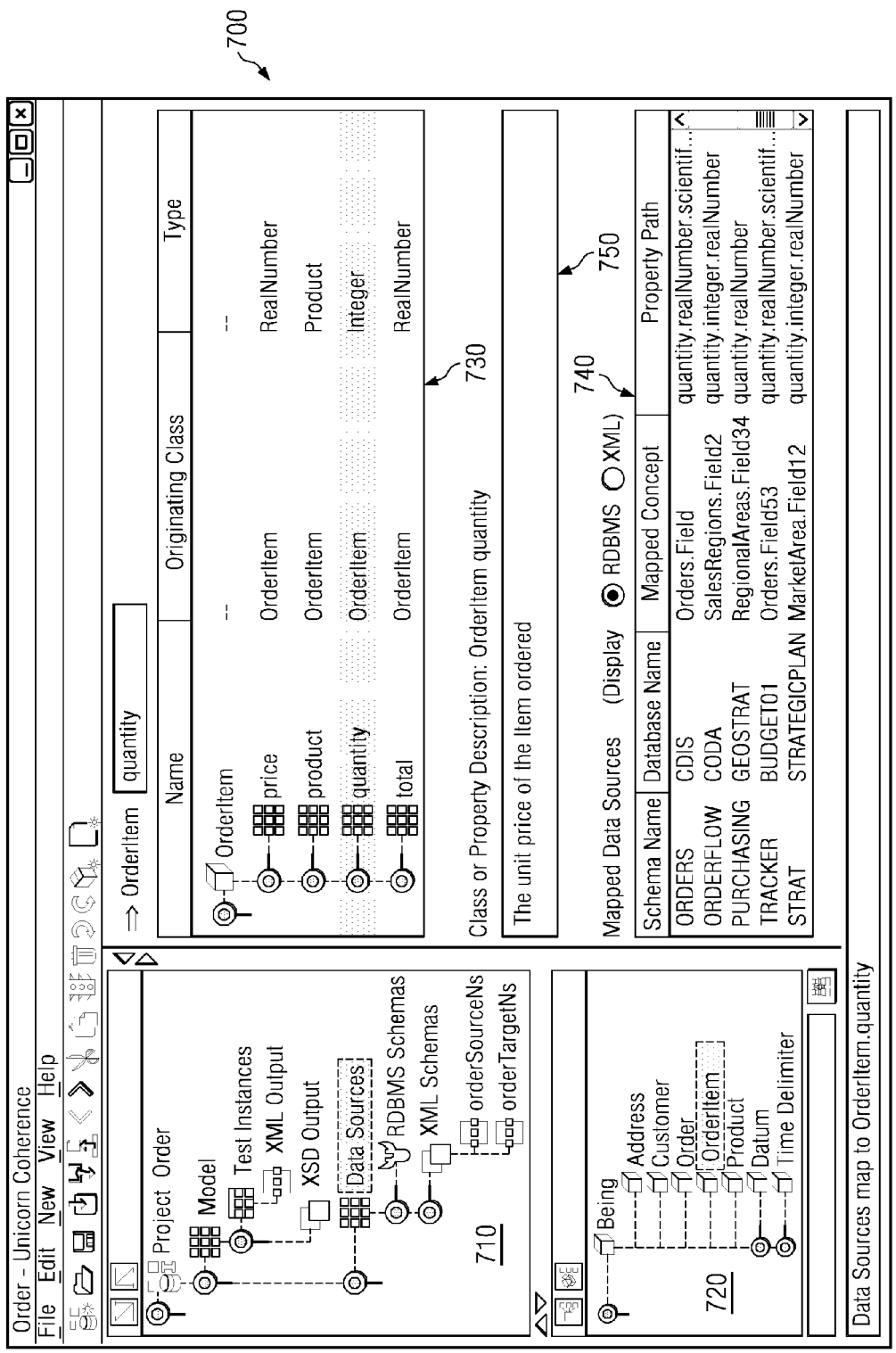
FIG. 7 is an illustration of a user interface for locating data within at least one data source, in accordance with a preferred embodiment of the present invention.

Reference is now made to FIG. 7, which is an illustration of a user interface for locating data within at least one data source, in accordance with a preferred embodiment of the present invention. Shown in FIG. 7 is a window 700 for locating data corresponding to selected classes or properties from a central ontology model. An upper left pane 710 displays components of a project named Order. Shown highlighted in pane 710 is a "Data Sources" component. A lower left pane 720 displays a class hierarchical view of an ontology model. Pane 710 indicates that all classes inherit from a superclass named Being. Shown highlighted in pane 710 is a class OrderItem, which is the subject class for data locating.

An upper right pane 730 displays properties defined on the class OrderItem. Shown highlighted in pane 730 is a property named quantity. In a preferred embodiment, the present invention is used to generate a list of data schema constructs and data sources having data for these constructs in a lower right pane 740. For example, pane 740 indicates that Field53 of a relational database table named Orders, within a relational database schema named TRACKER, corresponds to a representation of the property quantity, specifically to a value formatted as a real number in scientific notation. Moreover a database named GEOSTRAT has data for Field53.

An important feature of the present invention is the ability to locate data schema constructs that correspond to different representations of a specified property, such as quantity, and to identify the specific formats in which the data for such constructs are represented.

More generally, in a preferred embodiment the present invention locates data schema constructs that correspond to properties of a specified property. Consider, for example, a database table, Employee, mapped to an ontology class Employees, having a column for a laptop. Such a column Employee.laptop may be mapped to a composition of ontology properties Employee.laptop.model.name.noWhite Space. Here laptop is a property of class Employees of type Laptop, model is a property of class Laptop of type ComputerModel, name is a property of class ComputerModel of type String, and noWhiteSpace is a property of class String of type String. It is noted that when the present invention locates data for an employee's laptop, it points to the database table column Employee.laptop. It also provides the tail of the property so as to indicate that the column Employee.laptop contains data in the form of model.name.noWhiteSpace; i.e., the name of the laptop model formatted with no white space.

Finally, a pane 750 is used for displaying system messages regarding the results of the data locating process.

The data location features of the present invention may be used for data descriptor propagation as well. Specifically, a user may designate certain classes and properties of a central ontology as being of a certain type, such as "private" or "restricted use," and in accordance with a preferred embodiment of the present invention, such type designation is propagated to data sources having data in schema constructs that correspond to the designated classes and properties. Appropriate data in fields of relational database tables and in elements of XML documents is thereby designated as being private or of restricted use.

Reference is now made to FIG. 8, which is an illustration of a visual display for displaying data location results, in accordance with a preferred embodiment of the present invention. Shown in FIG. 8 are relational database schemas and XML schemas that have constructs corresponding to an ontology class Order and its properties.

As can be seen in FIG. 8, a relational database named Logistics conforming to a relational database schema named Shipping has a table named PurchaseOrder that corresponds to the ontology class Order. Furthermore, the table fields PurchaseOrder.id and PurchaseOrder.totalcost correspond respectively to the ontology properties Order.id and Order.total, the former being represented in integer format and the latter being represented in the format of a string in scientific notation. In addition, the table PurchaseOrder has a field with a foreign key to a table PurchaseOrderEntry, the key corresponding to the ontology property Order.customer.

As can also be seen in FIG. 8, an XML schema named orderTargetNS has a complex type named Shipment that corresponds to the ontology class Order.

The data location feature of the present invention is useful in generating location-based reports. Such reports provide strong analysis capabilities and assist in identifying data duplication, data redundancy and data inconsistency. For example, such reports may reveal that a specific database ignores a particular property, or that multiple data sources relate to the same class with each one containing data for different subsets of properties of the class.

Such reports provide statistics for classes and properties of an ontology, including inter alia the number of data sources that are mapped to them, distributed according to source type, source location, source owner and source update frequency. Such reports also show the percentage of ontology concepts covered by a given data source, including a graph and table indicating the number of properties of a given class mapped to the data source, and including a list of such properties. Such reports also indicate the number of instances per ontology class or property, and the number of the instances having only partial data.

EXAMPLES

For purposes of clarity and exposition, the workings of the present invention are described through three examples, followed by a general description of implementation. The first three examples hereinbelow correspond to the corresponding first three examples described in applicant's co-pending application U.S. Ser. No. 10/053,045, referenced hereinabove, the contents of which are hereby incorporated by reference. The fourth example hereinbelow corresponds to the seventh example described in applicant's co-pending application U.S. Ser. No. 10/053,045.

Data Query

A First Example: Schoolchildren

In a first example, three source tables are given as follows:

TABLE I

Source Table $S_1$ for First Example

| Name | School_Attending | Mother_NI_Number |
|------|------------------|------------------|

TABLE II

Source Table $S_2$ for First Example

| NI_Number | Name | Region | Car_Number |
|-----------|------|--------|------------|

TABLE II

Source Table $S_3$ for First Example

| Name | Location | HeadTeacher |
|------|----------|-------------|

Figure 9:
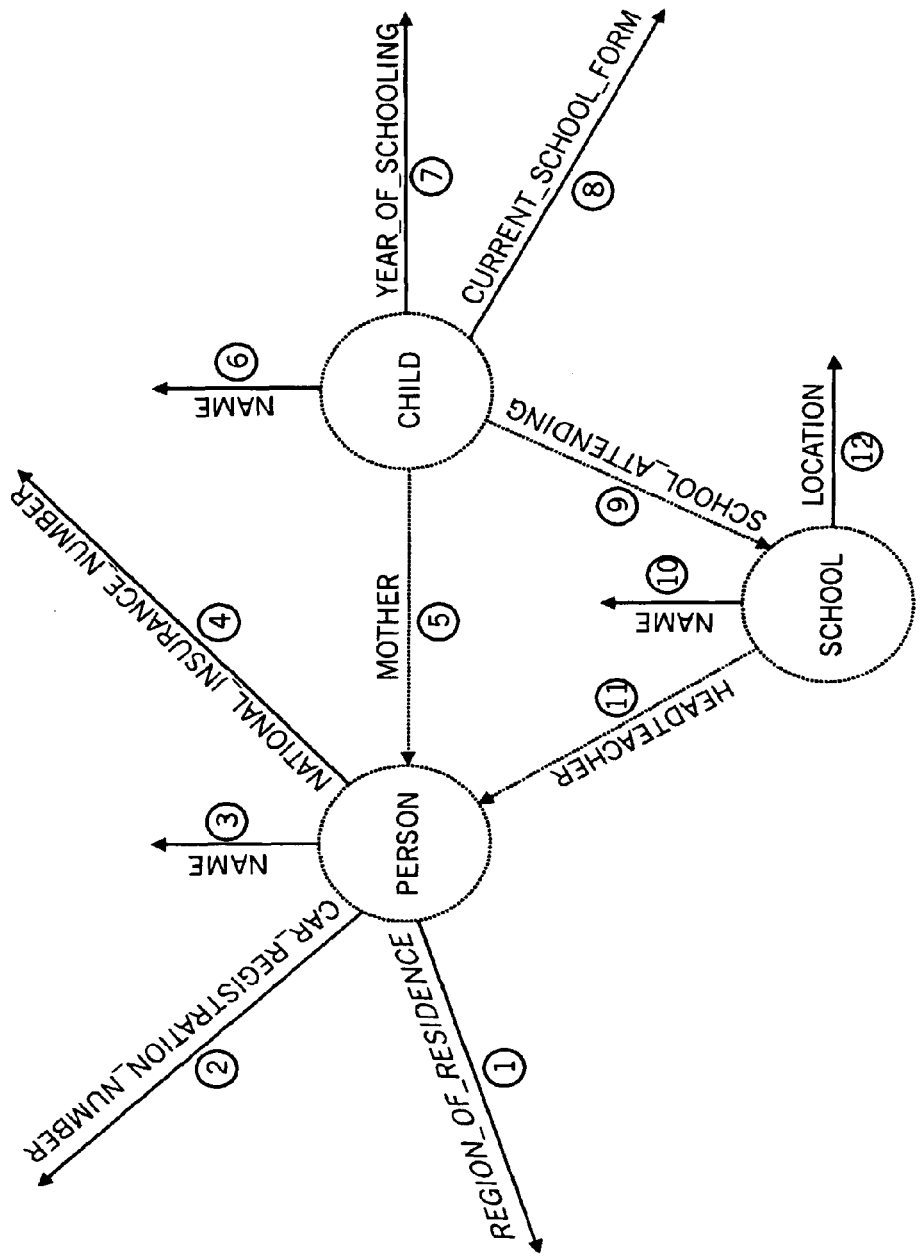
FIG. 9 is an illustration of ontology model corresponding to a first example.

The underlying ontology is illustrated in FIG. 9. The mapping of the source schema into the ontology is as follows, where the symbol o is used to indicate composition of properties.

TABLE IV

Mapping from Source schema to Ontology for First Example

| schema | Ontology | Property Index |
|--------|----------|----------------|
| $S_1$ | Class: Child | |
| $S_1$.Name | Property: Child.name | 6 |
| $S_1$.School_Attending | Property: Child.school_attending.name | 10o9 |
| $S_1$.Mother_NI_Number | Property: Child.mother.national_insurance_number | 4o5 |
| $S_2$ | Class: Person | |
| $S_2$.NI_Number | Property: Person.national_insurance_number | 4 |
| $S_2$.Name | Property: Person.name | 3 |
| $S_2$.Region | Property: Person.region_of_residence | 1 |
| $S_2$.Car_Number | Property: Person.car_registration_number | 2 |
| $S_3$ | Class: School | |
| $S_3$.Name | Property: School.name | 10 |
| $S_3$.Location | Property: School.location | 12 |
| $S_3$.HeadTeacher | Property: School.headteacher.nameheadteacher | 3o11 |

The following ontology language query is used to request a list of children's names and their mothers' names, for all children in the database who attend schools in London.

| | |
|---|---|
| SELECT: | Child.name, Child.mother.name |
| FROM: | Child |
| WHERE: | Child.school_attending.location = "London" |

Using the present invention, the above ontology language query is converted to the following corresponding SQL query:

| | |
|---|---|
| SELECT | $S_1$.Name, $S_2$.Name |
| FROM | ▬ |
| WHERE | $S_2$.NI_Number = $S_1$.Mother_NI_Number AND |
| | $S_3$.Name = $S_1$.School_Attending AND |
| | $S_3$.Location = "London" |

Data Query

A Second Example: Employees

In a second example, four source tables are given as follows:

TABLE V

Source Table $S_1$ for Second Example

| Emp_ID# | Name | Department |
|---------|------|------------|

TABLE VI

Source Table $S_2$ for Second Example

| Employee_Name | Supervisor | Project |
|---------------|------------|---------|

TABLE VII

Source Table $S_3$ for Second Example

| ID# | Room_Assignment | Telephone# |
|-----|-----------------|------------|

TABLE VIII

Source Table $S_4$ for Second Example

| Department | Budget |
|------------|--------|

Figure 10:
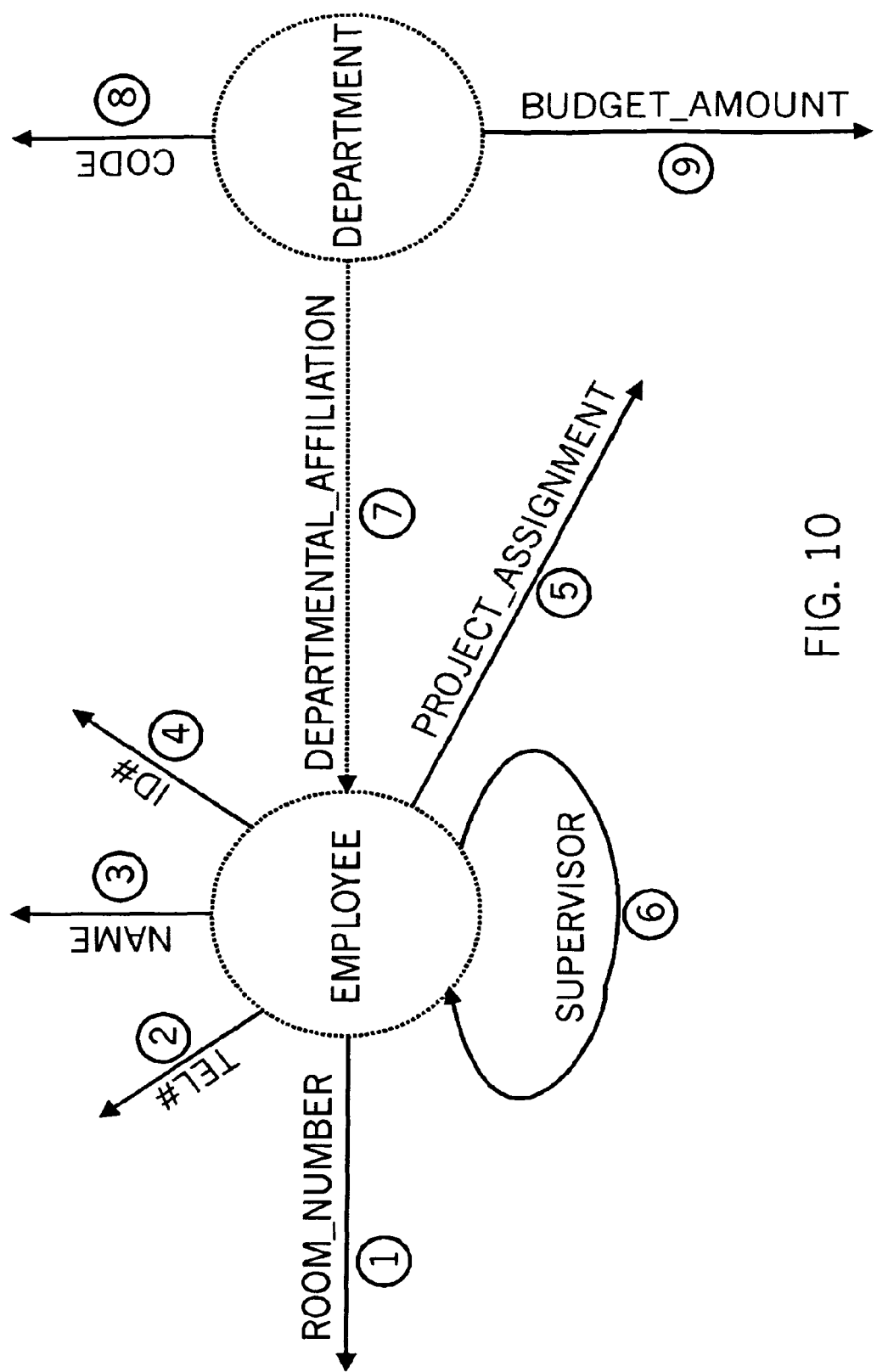
FIG. 10 is an illustration of ontology model corresponding to a second example.

The underlying ontology is illustrated in FIG. 10. The mapping of the source schema into the ontology is as follows:

TABLE IX

Mapping from Source schema to Ontology for Second Example

| schema | Ontology | Property Index |
|---|---|---|
| $S_1$ | Class: Employee | |
| $S_1$.Emp_ID# | Property: Employee.ID# | 4 |
| $S_1$.Name | Property: Employee.name | 3 |
| $S_1$.Department | Property: Employee.departmental_affiliation.code | 8o7 |
| $S_2$ | Class: Employee | |
| $S_2$.Employee_Name | Property: Employee.name | 3 |
| $S_2$.Supervisor | Property: Employee.supervisor.name | 3o6 |
| $S_2$.Project | Property: Employee.project_assignment | 5 |
| $S_3$ | Class: Employee | |
| $S_3$.ID# | Property: Employee.ID# | 4 |
| $S_3$.Room_Assignment | Property: Employee.room_number | 1 |
| $S_3$.Telephone# | Property: Employee.tel# | 2 |
| $S_4$ | Class: Department | |
| $S_4$.Department | Property: Department.code | 8 |
| $S_4$.Budget | Property: Department.budget_amount | 9 |

The following ontology language query is used to request a list of employees' names, departments and supervisors, for all employees in the database who are assigned to Room 101.

```
SELECT:  Employee.name, Employee.department, Employee.supervisor
FROM:    Employee
WHERE:   Employee.room_number = "101"
```

Using the present invention, the above ontology language query is converted to the following corresponding SQL query:

```
SELECT   S1.Name, S1.Department, S2.Supervisor
FROM     ▅▅▅
WHERE    S2.Employee_Name = S1.Name AND
         S3.ID# = S1.Emp_ID# AND
         S3.Room_Assignment = "101"
```

Data Query

A Third Example: Airline Flights

In a third example, two source tables are given as follows:

TABLE X

Source Table $S_1$ for Third Example

| Index | APName | Location |
|---|---|---|

TABLE XI

Source Table $S_2$ for Third Example

| FlightID | FromAirport | ToAirport |
|---|---|---|

Figure 11:
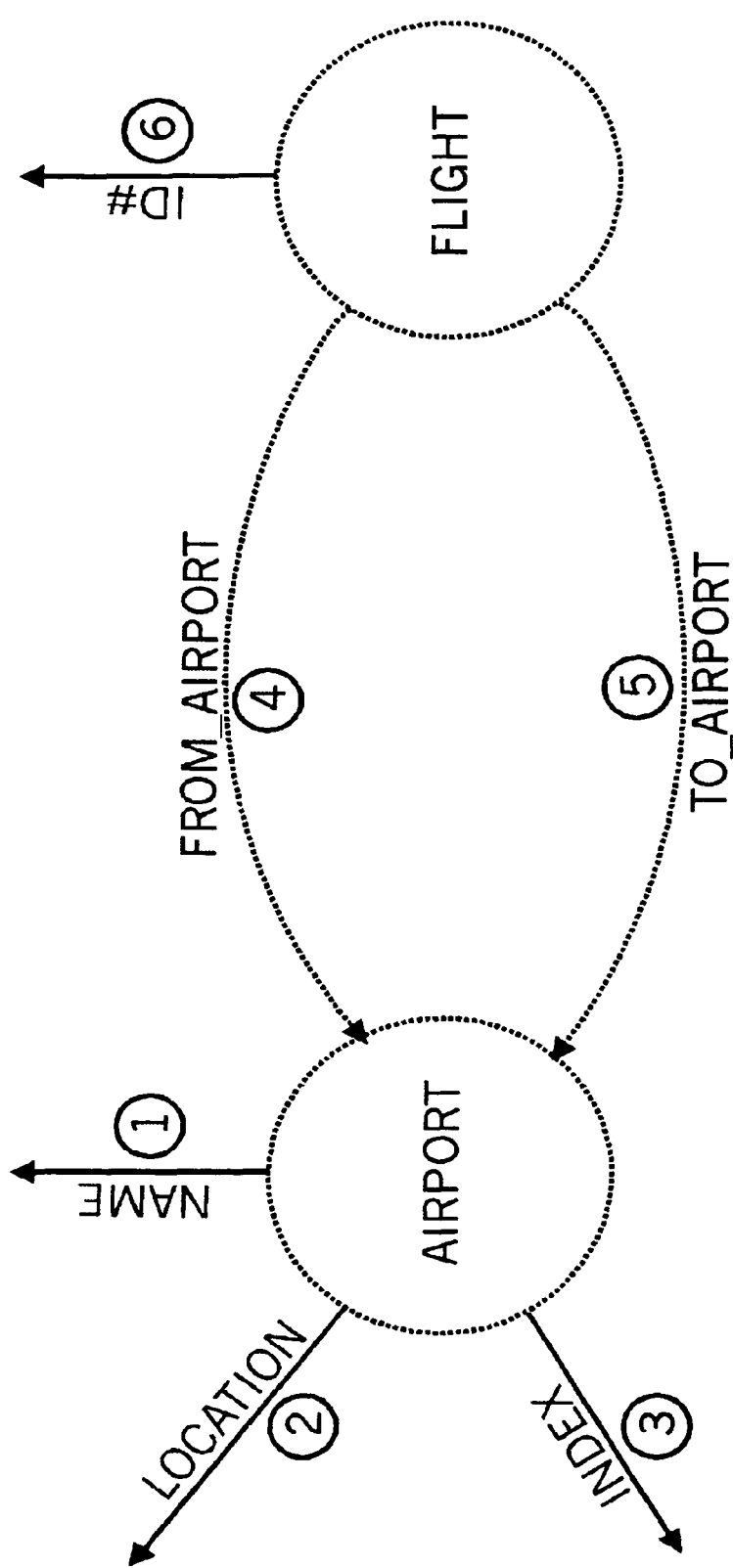
FIG. 11 is an illustration of ontology model corresponding to a third example.

The underlying ontology is illustrated in FIG. 11. The mapping of the source schema into the ontology is as follows:

TABLE XII

Mapping from Source schema to Ontology for Third Example

| schema | Ontology | Property Index |
|---|---|---|
| $S_1$ | Class: Airport | |
| $S_1$.Index | Property: Airport.index | 3 |
| $S_1$.APName | Property: Airport.name | 1 |
| $S_1$.Location | Property: Airport.location | 2 |
| $S_2$ | Class: Flight | |
| $S_2$.FlightID | Property: Flight.ID# | 6 |
| $S_2$.FromAirport | Property: Flight.from_airport.name | 1o4 |
| $S_2$.ToAirport | Property: Flight.to_airport.name | 1o5 |

The following ontology language query is used to request a list of flight numbers, for all flights from New York to San Francisco.

```
SELECT:  Flight.ID#
FROM:    Flight
WHERE:   Flight.from_airport.location = "New York" AND
         Flight.to_airport.location = "San Francisco"
```

Using the present invention, the above ontology language query is converted to the following corresponding SQL query:

```
SELECT   S2.FlightID,
FROM     ▅▅▅
WHERE    S11.APName = S2.FromAirport AND
         S12.APName = S2.ToAirport AND
         S11.Location = "New York" AND
         S12.Location = "San Francisco"
```

Data Location

A Fourth Example: Employees

In the fourth example, four source tables are given as follows:

TABLE XIII

Source Table $S_1$ for Seventh Example

| ID | Group |
|----|-------|

TABLE XIV

Source Table $S_2$ for Seventh Example

| ID | Email |
|----|-------|

TABLE XV

Source Table $S_3$ for Seventh Example

| ID | Email_Address |
|----|---------------|

TABLE XVI

Source Table $S_4$ for Seventh Example

| ID | Unit |
|----|------|

Figure 12:
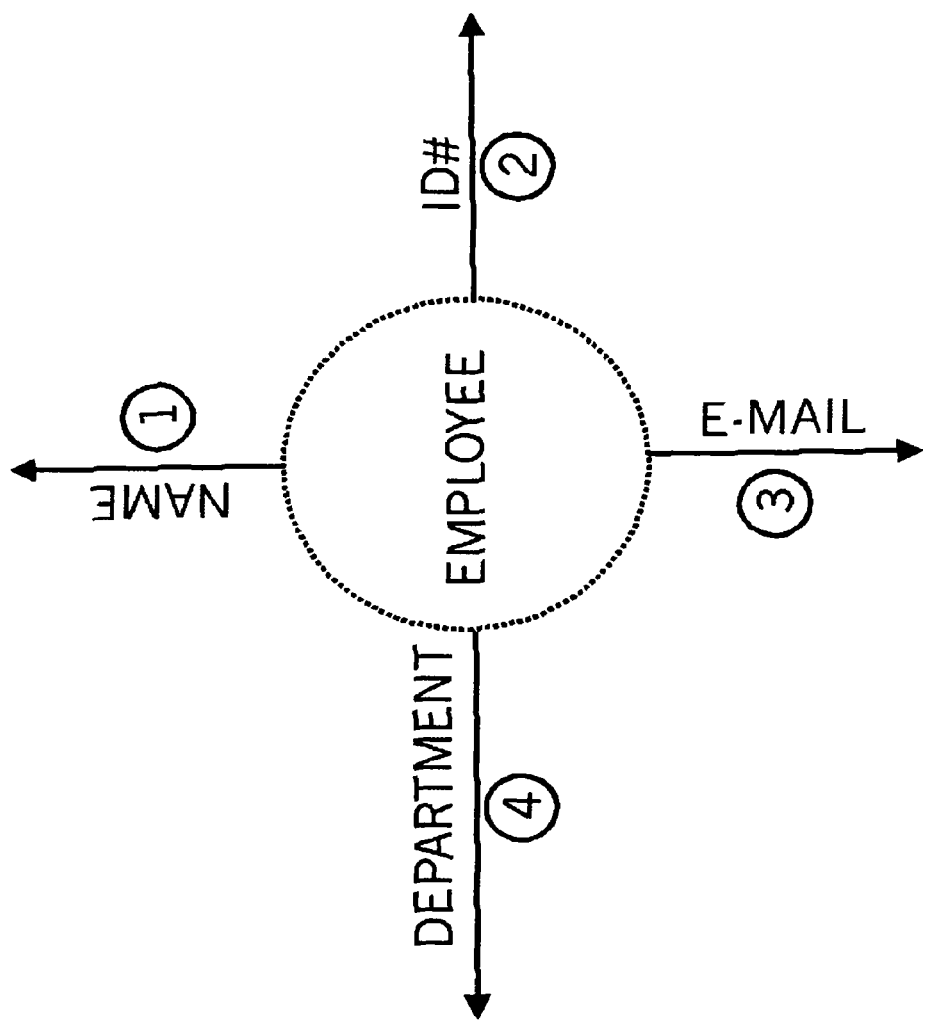
FIG. 12 is an illustration of ontology model corresponding to a fourth example.

The underlying ontology is illustrated in FIG. 12. The mapping of the source schema into the ontology is as follows:

TABLE XVII

Mapping from Source schema to Ontology for Seventh Example

| Schema | Ontology | Property Index |
|--------|----------|----------------|
| $S_1$ | Class: Employee | |
| $S_1$.ID | Property: Employee.ID# | 2 |
| $S_1$.Group | Property: Employee.department | 4 |
| $S_2$ | Class: Employee | |
| $S_2$.ID | Property: Employee.ID# | 2 |
| $S_2$.Email | Property: Employee.e-mail | 3 |
| $S_3$ | Class: Employee | |
| $S_3$.ID | Property: Employee.ID# | 2 |
| $S_3$.Email_Address | Property: Employee.e-mail | 3 |
| $S_4$ | Class: Employee | |
| $S_4$.ID | Property: Employee.ID# | 2 |
| $S_4$.Unit | Property: Employee.department | 4 |

For the property Employee.e-mail, the present invention indicates that this data is located at $S_2$.Email and $S_4$.Email_Address. Similarly, for the property Employee.department, the present invention indicates that this data is located at $S_1$.Group and $S_3$.Unit.

Multi-Valued Properties in an Ontology

A multi-valued property is a property that maps an instance in its source class to more than one instance in its target class. For example, a property Person.children may map a person from class Person to more than one child in class Person.

In order to effectively allow for multi-valued properties in addition to single-valued properties, provision is made in an ontology for "container" classes. Generally, container classes are built from simpler classes using tags for set, list and bag. The set symbol is used for describing a class comprising subsets of a class. The list symbol is used for describing a class comprising ordered subsets of a class; namely, sequences. The bag symbol is used for describing unordered finite sequences of a class, namely, subsets that can contain repeated elements. Thus set[C] describes the class of sets of instances of a class C, list[C] describes the class of lists of instances of class C, and bag[C] describes the class of bags of instances of class C. Elements of a sequence s ∈ list[C] are denoted by s[0], s[1], . . . .

In terms of formal mathematics, for a set C, set[C] is $2^C$, the power set of C; bag[C] is $N^C$, where N is the set of non-negative integers; and list[C] is $C^N$; more precisely, the subset of $C^N$ consisting of finite sequences. There are natural projections $$\text{list}[C] \xrightarrow{\phi} \text{bag}[C] \xrightarrow{\psi} \text{set}[C]. \quad (1)$$

Specifically, for a sequence (c[0], c[1], . . . , c[n])∈list[C], φ(c[0], c[1], . . . , c[n]) is the element f∈bag[C] that is the "frequency histogram" defined by f(c)=#{0≤i≤n: c[i]=c}; and for f∈bag[C], ψ(f)∈set[C] is the subset of C given by the support of f, namely, supp(f)={c∈C: f(c)>0}. It is noted that the composite mapping φ∘ψ maps the sequence (c[0], c[1], . . . , c[n]) into the set of its elements {c[0], c[1], . . . , c[n]}. Each projection in Equation (1) removes some structure. Specifically, φ removes order and ψ removes repetition.

Using container sets, provision is made for multi-valued properties. Generally, the target of a multi-valued property is a container class. For example, a multi-valued property named children may have a class Person as its source and a container class set[Person] as its target.

A single-valued property p: C→D, from a class C to a class D has natural liftings to set[C], bag[C] and list[C]. Specifically, the lifting to sets, p: set[C]→set[D] is defined by p(S)={p(s): s∈S} for subsets S⊂C. The lifting to bags, p: bag[C]→bag[D] is defined by $$p(f): d \mapsto \sum_{c \in p^{-1}(d)} f(c),$$

for f∈$N^C$. The lifting to lists, p: list[C]→list[D] is defined by p(s)=p∘s, for a sequence s∈$C^N$.

Figure 13:
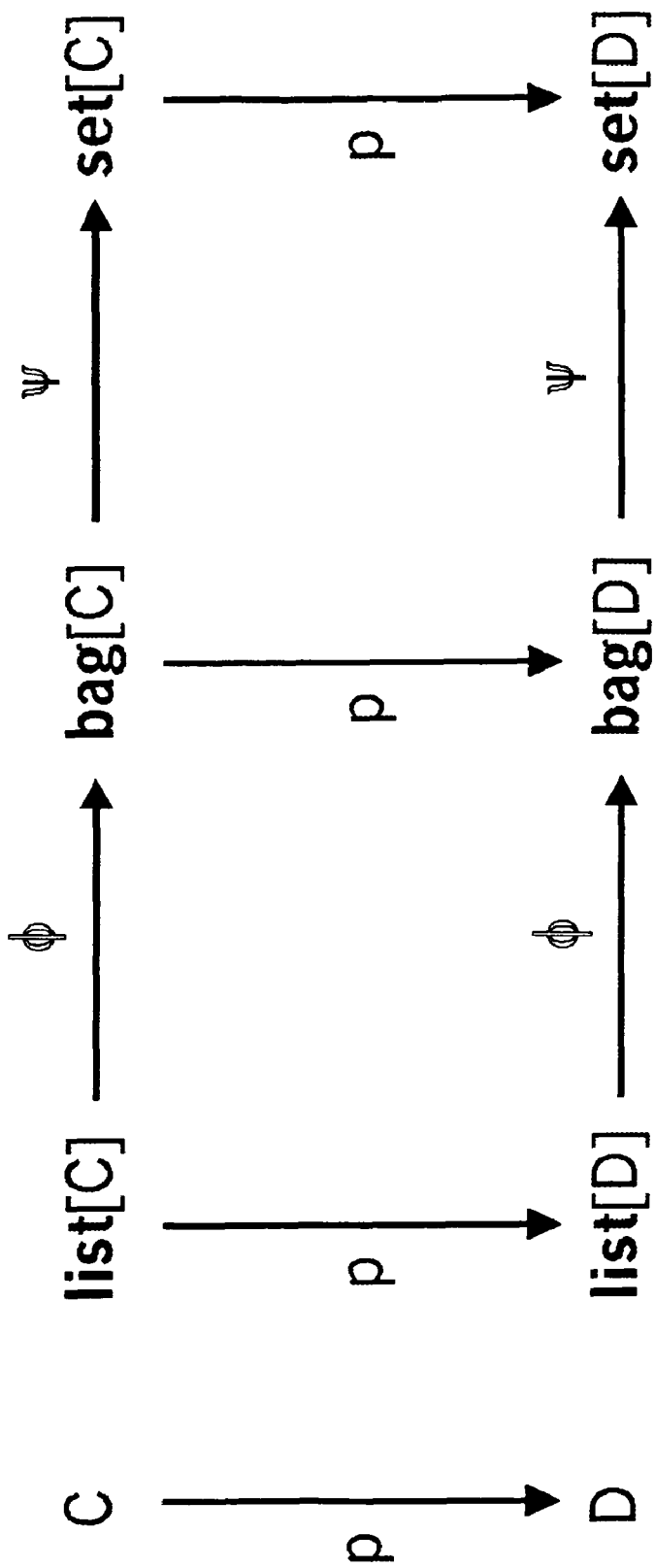
FIG. 13 is a commutative diagram illustrating consistency of multi-valued properties.

An important feature of these liftings of p is their consistency with the projections from Equation (1), as illustrated by the commutative diagrams in FIG. 13.

Compositions of multi-valued properties is governed by Equation (1). Specifically, a multi-valued property p with target bag[C] can be followed by a property q with source set[C] according to qp=q∘ψ∘p. Similarly, a multi-valued property p with target list[C] can be followed by a property q with source bag[C] according to qp=q∘φ∘p, and a multi-valued property p with target list[C] can be followed by a property q with source set[C] according to qp=q∘φ∘ψ∘p.

For example, a property totalCost: bag[Components]→Values can be applied to list[Components] by converting a list to a bag via the projection φ.

Familiar algebraic data structures including inter alia vectors and matrices correspond to lists of pre-determined length.

For data models that require the notion of an ordered set of instances without repetition, such a structures are considered as a special subset of list[C]; namely, lists without repetition.

To simplify compositions of properties, in one embodiment of the present invention special identifications are made to collapse containers of containers. Specifically, set[set[C]] is identified as set[C], through the set union. Thus, Person.children.children is identified as a set of people corresponding to a person's grandchildren, instead of as a set of sets of people. Similarly, bag[bag[C]] is identified as bag[C] by adding frequencies, and list[list[C]] is identified as list[C] by combining a list of lists into a single list.

Optionally, set[bag[C]], bag[set[C]], set[list[C]] and list[set[C]] may be identified as set[C] by removing order and repetition structure through use of the projections $\phi$ and $\psi$ from Equation (1). Similarly, bag[list[C]] and list[bag[C]] may be identified as bag[C] by removing order structure through use of the projection $\phi$ from Equation (1).

In an alternate embodiment of the present invention, containers of containers are not collapsed.

In data models it is often important to indicate minimum and maximum numbers of elements in the target of a multi-valued property. For example, a property Person.parents has a maximum of two elements in its target set. To this end, multi-valued properties may have min_elements and max_elements as attributes. Such attributes serve to limit the target of multi-valued properties to specific subsets of set[C], bag[C] and list[C]; namely, those subsets, bags and lists, respectively, having a number of elements, n, satisfying min_elements$\leq$n$\leq$max_elements.

In a preferred embodiment of the present invention, constraints may be imposed relating single-valued and multi-valued properties. For example, a constraint BillOfGoods.totalCost=$\Sigma$BillOfGoods.items[k].cost relates properties totalCost: BillOfGoods$\rightarrow$Values, items: BillOfGoods$\rightarrow$list[Parts] and cost: Parts$\rightarrow$Values.

Multi-valued properties can be used to model n-ary relationships within an ontology. For example, a tertiary relationship $R \subset C_1 \times C_2 \times C_3$ can be modeled as a property r: $C_1 \rightarrow$ set $[C_2 \times C_3]$, defined according to $r(c_1)=\{(c_2, c_3): R(c_1, c_2, c_3)\}$. The ability to model relationships enables the present invention to import data models that support relationships, such as the entity-relationship data model. Many-to-many relationships can be imported as multi-valued ontology properties. A reference for the entity-relationship data model is Garcia-Molina, Ullman, Jeffrey D. and Widom, Jennifer, "Database Systems: The Complete Book," Prentice Hall, Upper Saddle River, N.J., 2002.

In a preferred embodiment of the present invention, multi-valued properties are used for embedding data schema into an ontology model, for schema that include constructs that can include more than one data elements.

For example, XML complexTypes can include sets of sequences of XML elements therewithin. Consider the XML schema from Example Fourteen of applicant's above-referenced co-pending application U.S. Ser. No. 10/053,045.

```
<?xml version="1.0" encoding="UTF-8"?>
<xs:schema xmlns:xs="http://www.w3.org/2001/XMLschema">
    <xs:element name="storage" type="Storage"/>
    <xs:complexType name="Storage">
        <xs:sequence>
            <xs:element name="articles" type="Documents"/>
            <xs:element name="reviews" type="Documents"/>
            <xs:element name="letters" type="Letters"/>
        </xs:sequence>
    </xs:complexType>
    <xs:complexType name="Documents">
        <xs:sequence>
            <xs:element name="document" type="Document"
                minOccurs="0"
                        maxOccurs="unbounded"/>
        </xs:sequence>
    </xs:complexType>
    <xs:complexType name="Letters">
        <xs:sequence>
            <xs:element name="letter" type="Letter" minOccurs="0"
                        maxOccurs="unbounded"/>
        </xs:sequence>
```

-continued

```
    </xs:complexType>
    <xs:complexType name="Document">
        <xs:sequence>
            <xs:element name="author" type="xs:string"
                minOccurs="0"
                        maxOccurs="unbounded"/>
        </xs:sequence>
        <xs:attribute name="title"/>
    </xs:complexType>
    <xs:complexType name="Letter">
        <xs:sequence>
            <xs:element name="author" type="xs:string"
                minOccurs="0"
                        maxOccurs="unbounded"/>
        </xs:sequence>
        <xs:attribute name="name"/>
        <xs:attribute name="subject"/>
        <xs:attribute name="receiver"/>
    </xs:complexType>
</xs:schema>
```

Figure 14:
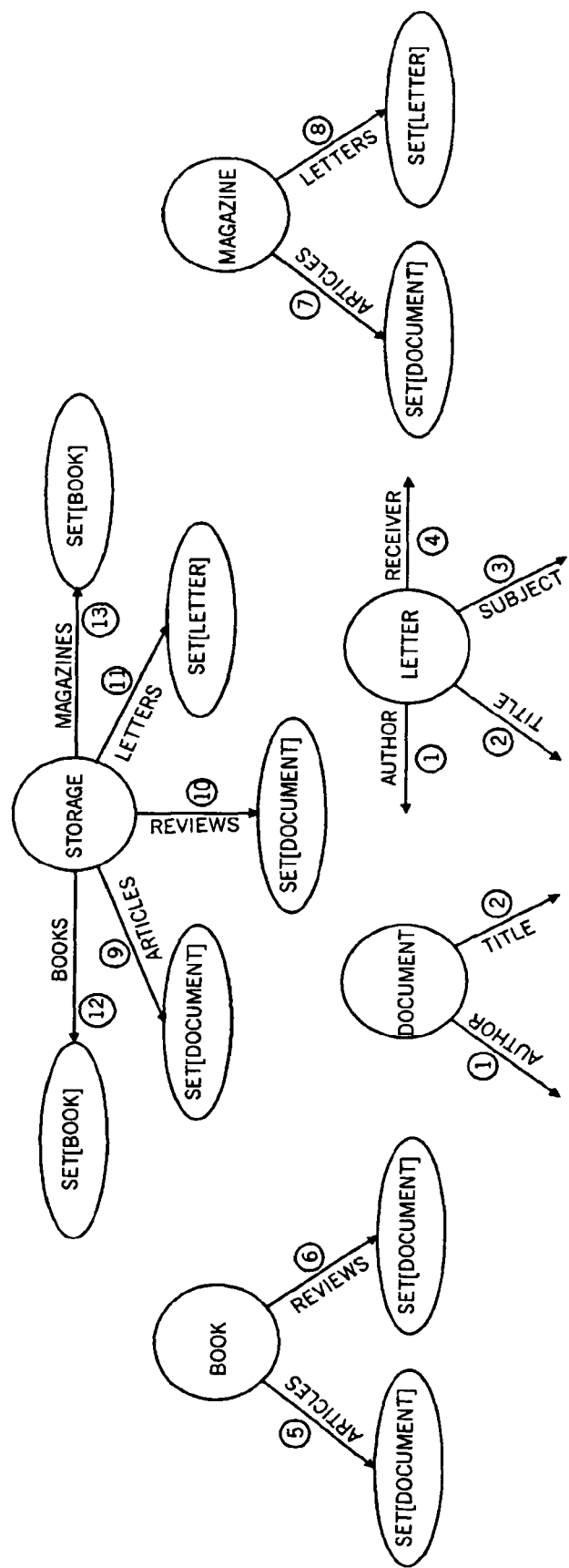
FIG. 14 is an illustration of ontology model with multi-valued properties.

The underlying ontology is illustrated in FIG. 14. Observe that the XML element "letters" within the XML complexType "storage" corresponds to the multi-valued property Storage.letters from the class Storage to the container class set[Letter]. Similarly the XML elements "articles" and "reviews" within the XML complexType "storage" correspond to multi-valued properties Storage.articles and Storage.reviews, respectively, from the class Storage to the container class set[Document].

Cobol Copy Books

The present invention can be used to query COBOL records. Using COBOL, variables are declared as follows:

| | |
|---|---|
| 01 StudentDetails. | |
| 02 StudentId | PIC 9(7). |
| 02 StudentName. | |
| 03 FirstName | PIC X(10). |
| 03 MiddleInitial | PIC X. |
| 03 Surname | PIC X(15). |
| 02 DateofBirth. | |
| 03 DayofBirth | PIC 99. |
| 03 MonthofBirth | PIC 99. |
| 03 YearofBirth | PIC 9(4). |
| 02 CourseCode | PIC X(4). |

The variable StudentDetails includes group items, emphasized above in bold, and elementary items. Data can be read or written from variables provided that the size of the data corresponds to the declared sizes.

In the above typing for elementary items, 9 denotes a number and X denotes an alphanumeric. The notation 9(5) denotes a five digit non-negataive integer. In addition, V is used to denote a decimal point, and S is used to denote a sign.

A COBOL Copy Book (CCB) is the metadata for COBOL format data that is saved to disk. A CCB defines the format of a COBOL record. The instances of a record defined by a CCB are in binary format.

It is noted that the above CCB corresponds to the following XML schema:

```
<element name="StudentDetails">
    <complexType>
        <sequence>
            <element name="StudentId" type="integer"/>
            <element name="StudentName">
```

```
            <complexType>
                <sequence>
                    <element name="FirstName"
                        type=" string"/>
                    <element name="MiddleInitial"
                        type="string"/>
                    <element name="Surname"
                        type="string"/>
                </sequence>
            </complexType>
        </element>
        <element name="DateofBirth">
            <complexType.
                <sequence>
                    <element name="DayofBirth"
                        type="integer"/>
                    <element name="MonthofBirth"
                        type="integer"/>
                    <element name="YearofBirth"
                        type="integer"/>
                </sequence>
            </complexType>
        </element>
        <element name="CourseCode" type="string"/>
    </sequence>
</complexType>
</element>
```

Specifically, a CCB corresponds to a restricted type of XML schema. Group items in a CCB correspond to complexTypes in an XML schema, and elementary items in a CCB correspond to elements in an XML schema.

Implementation Details

The present invention overcomes several challenges when converting queries from the three-clause SELECT-FROM-WHERE ontology query language to data schema query language. For conversion to SQL, these include:

1. Joining appropriate tables corresponding to one or more classes in the FROM clause.

2. Identifying fields corresponding to one or more properties in the SELECT clause.

3. Converting conditions in the WERE clause to SQL format. The former two challenges involve the mapping from tables and fields of relational database schemas into classes and properties of an ontology model, and can be overcome using applicant's technology for generating SQL transformations, as described in applicant's co-pending application U.S. Ser. No. 10/053,045, referenced hereinabove. Specifically, this application describes generating transformations for populating target data conforming to a target data schema from source data conforming to a source data schema. In particular, this application describes how to express target schema constructs in terms of source schema constructs. For the case at hand, the target schema constructs are the properties in the SELECT clause.

The latter challenge involves converting a logical expression from ontology format into SQL format, and can be overcome using Codd's normalization for converting from first order logic to SQL.

For conversion of an ontology query to an XQuery, three similar challenges arise, where complex types correspond to one or more classes in the FROM clause and elements and attributes correspond to one or more properties in the SELECT clause. As above, applicant's co-pending U.S. Ser. No. 10/053,045 describes generating XSL transformations, which can be used to overcome the first two challenges.

The latter challenge involves converting a logical expression from ontology format to XQuery format.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A system for processing a query, the system comprising:
a CPU, a computer readable memory, and a computer-readable tangible storage device;
first program instructions to receive a first query expressed in a first query language other than XML database schema and relational database schema, the first query language including classes and properties;
second program instructions, responsive to the receipt of the first query, to determine that an XML database includes a class and a property that correspond to a class and a property of the first query, translate the first query to an XML database schema of the XML database, and initiate search of the XML database for data responsive to the query translated to the XML database schema; and
third program instructions, responsive to the receipt of the first query, to determine that a relational database includes a class and a property that correspond to the class and the property of the first query, translate the first query to a relational database schema of the relational database, and initiate search of the relational database for additional data responsive to the query translated to the relational database schema; and wherein
the first, second and third program instructions are stored on the computer-readable tangible storage device for execution by the CPU via the computer readable memory.

2. The system of claim 1 wherein:
the second program instructions translate the first query to the XML database schema by translating the first query to a name of the XML database schema and associated concept and concept path.

3. The system of claim 2 wherein:
the third program instructions translate the first query to the relational database schema by translating the first query to a name of the relational database schema and associated database name and mapped table.

4. The system of claim 2 wherein:
the third program instructions translate the first query to the relational database schema by translating the first query to a name of the relational database schema and associated database name, mapped concept and property path.

5. The system of claim 1 wherein:
the class of the first query specifies a type of data; and
the second program instructions determine that an XML database includes a class and a property that correspond to the class specified in the first query, and determine that a relational database includes a class and a property that correspond to the class specified in the first query, by reading a table which lists both the XML database and relational database as including sources of data for the class specified in the first query.

6. The system of claim 1 wherein:
the second program instructions translate the first query to the XML database schema of the XML database by translating the first query to a name of the XML database schema and associated concept and concept X-Path.

7. A computer program product for processing a first query, the computer program product comprising:

a computer-readable tangible storage device;

first program instructions to receive a first query expressed in a first query language other than XML database schema and relational database schema, the first query language including classes and properties;

second program instructions, responsive to the receipt of the first query, to determine that an XML database includes a class and a property that correspond to a class and a property of the first query, translate the first query to an XML database schema of the XML database, and initiate search of the XML database for data responsive to the query translated to the XML database schema; and third program instructions, responsive to the receipt of the first query, to determine that a relational database includes a class and a property that correspond to the class and the property of the first query, translate the first query to a relational database schema of the relational database, and initiate search of the relational database for additional data responsive to the query translated to the relational database schema; and wherein the first, second and third program instructions are stored on the computer-readable tangible storage device.

8. The computer program product of claim 7 wherein:
the second program instructions translate the first query to the XML database schema by translating the first query to a name of the XML database schema and associated concept and concept path.

9. The computer program product of claim 8 wherein:
the third program instructions translate the first query to the relational database schema by translating the first query to a name of the relational database schema and associated database name and mapped table.

10. The computer program product of claim 8 wherein:
the third program instructions translate the first query to the relational database schema by translating the first query to a name of the relational database schema and associated database name, mapped concept and property path.

11. The computer program product of claim 7 wherein:
the class of the first query specifies a type of data; and
the second program instructions determine that an XML database includes a class and a property that correspond to the class specified in the first query, and determine that a relational database includes a class and a property that correspond to the class specified in the first query, by reading a table which lists both the XML database and relational database as including sources of data for the class specified in the first query.

12. The computer program product of claim 7 wherein:
the second program instructions translate the first query to the XML database schema of the XML database by translating the first query to a name of the XML database schema and associated concept and concept X-Path.

* * * * *